(12) United States Patent
Van Schaijk et al.

(10) Patent No.: US 7,819,233 B2
(45) Date of Patent: Oct. 26, 2010

(54) DEVICE FOR DIVERTING PRODUCTS SIDEWAYS FROM A CONVEYOR

(75) Inventors: Erwin Hendrikus Petrus Martinus Johannes Van Schaijk, GD Vinkel (NL); Bram Antonius Carolus Van Rijt, CB Bergeijk (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 11/374,054

(22) Filed: Mar. 14, 2006

(65) Prior Publication Data

US 2006/0254880 A1    Nov. 16, 2006

Related U.S. Application Data

(60) Provisional application No. 60/758,540, filed on Jan. 13, 2006.

(30) Foreign Application Priority Data

Mar. 14, 2005   (NL)   .................................... 1028536

(51) Int. Cl.
  *B65G 47/74*   (2006.01)
  *B65G 47/76*   (2006.01)
(52) U.S. Cl. ........................ 198/370.09; 198/370.08; 198/370.07; 198/598
(58) Field of Classification Search ................. 198/367, 198/370.07, 370.08, 370.09
  See application file for complete search history.

(56) References Cited

U.S. PATENT DOCUMENTS

| | | | | |
|---|---|---|---|---|
| 1,532,228 | A | * | 4/1925 | Carpenter .................... 198/367 |
| 1,729,671 | A | | 10/1929 | Bell-Irving et al. |
| 1,909,481 | A | | 5/1933 | Allen |
| 2,690,250 | A | * | 9/1954 | Coleman .................... 198/866 |
| 3,104,755 | A | | 9/1963 | Zuercher |
| 3,543,916 | A | * | 12/1970 | Berk .......................... 198/367 |

(Continued)

FOREIGN PATENT DOCUMENTS

DE    19 10 355 A1    10/1969

(Continued)

*Primary Examiner*—Gene Crawford
*Assistant Examiner*—Kavel P Singh
(74) *Attorney, Agent, or Firm*—Oblon, Spivak, McClelland, Maier & Neustadt, L.L.P.

(57) ABSTRACT

The invention provides a device for selectively diverting products sideways from a load-bearing conveying surface of a conveyor that is moving in a direction of transport, comprising a frame, an elongated diverter element having an upstream end, a downstream end and a deflecting surface there between, pivoting means for pivoting the diverter element in a reciprocal fashion about a vertical pivot axis extending on one side of the conveying surface, between a passive position, in which the diverter element extends beside the conveying surface so as to allow products to pass freely on the conveying surface, and an active position, in which the diverter element extends at least partially above the conveying surface for diverting products present on the conveying surface sideways from said conveying surface, and driving means for driving the deflecting surface with respect to a remaining part of the diverter element at least in the active position, wherein the pivoting means are arranged for translating the diverter element as well during the pivoting movement of the diverter element from the passive position to the active position and vice versa.

21 Claims, 19 Drawing Sheets

U.S. PATENT DOCUMENTS

| | | | |
|---|---|---|---|
| 3,921,786 A * | 11/1975 | Hejmanowski | 198/370.07 |
| 4,711,357 A | 12/1987 | Langenbeck et al. | |
| 5,217,104 A * | 6/1993 | Pelletier | 198/367 |
| 5,988,356 A * | 11/1999 | Bonnet | 198/598 |
| 6,220,422 B1 * | 4/2001 | Lee | 198/370.07 |
| 6,863,171 B2 * | 3/2005 | Blok et al. | 198/370.08 |
| 6,910,568 B1 * | 6/2005 | Ydoate et al. | 198/370.07 |

FOREIGN PATENT DOCUMENTS

| | | |
|---|---|---|
| WO | WO 02/14193 A2 | 2/2002 |
| WO | WO 2004/085295 A2 | 10/2004 |

* cited by examiner

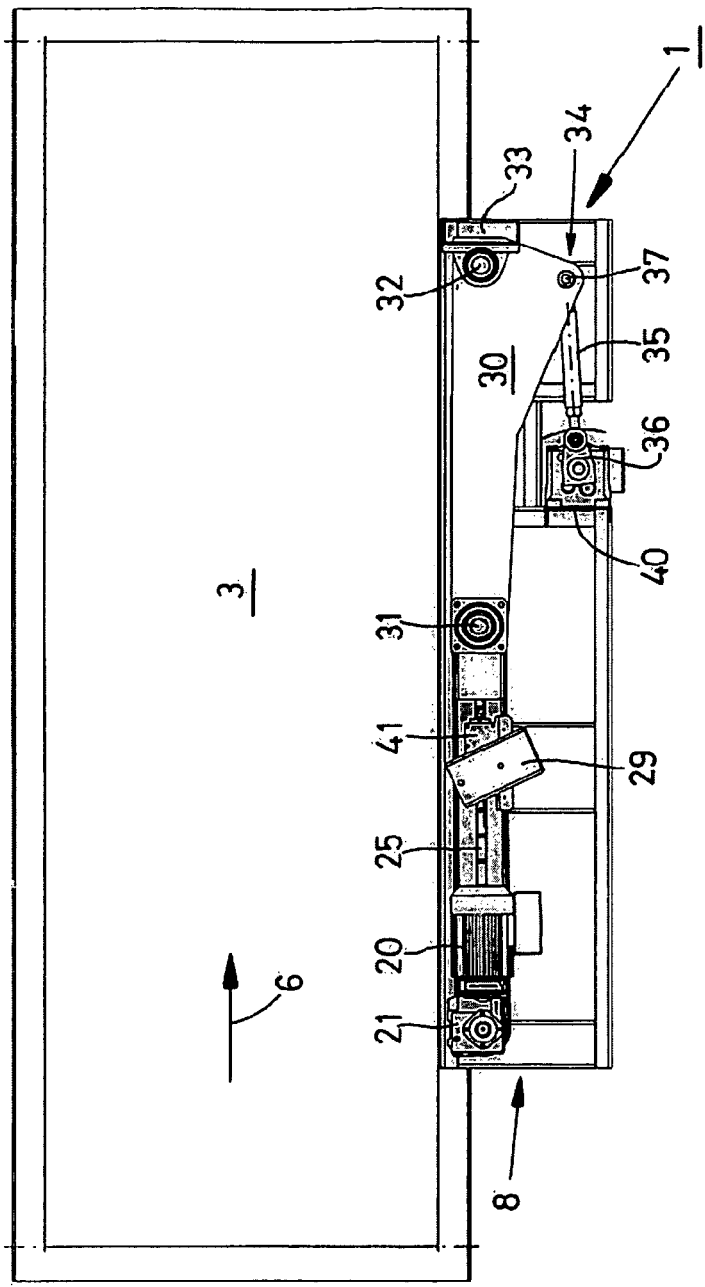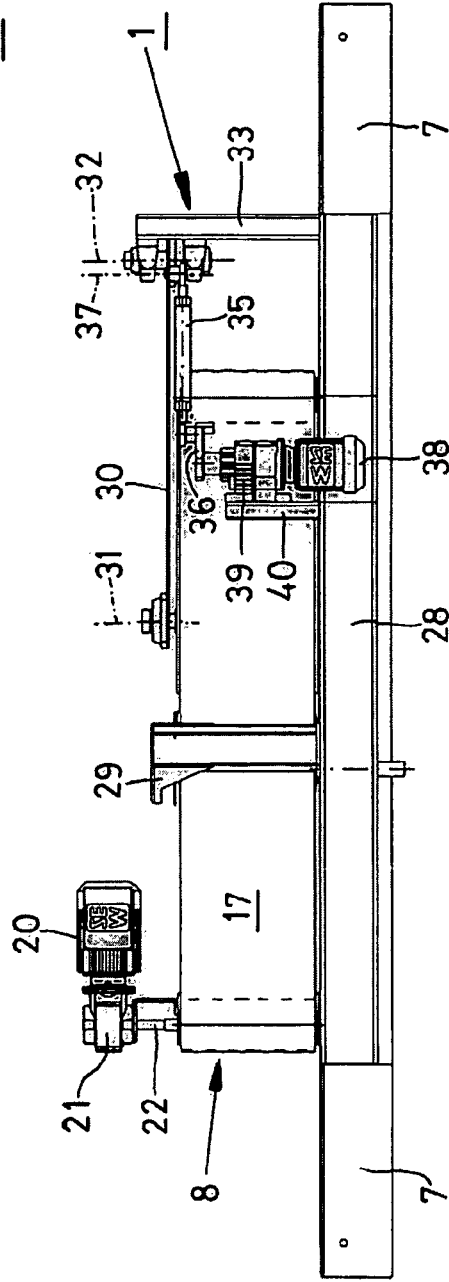

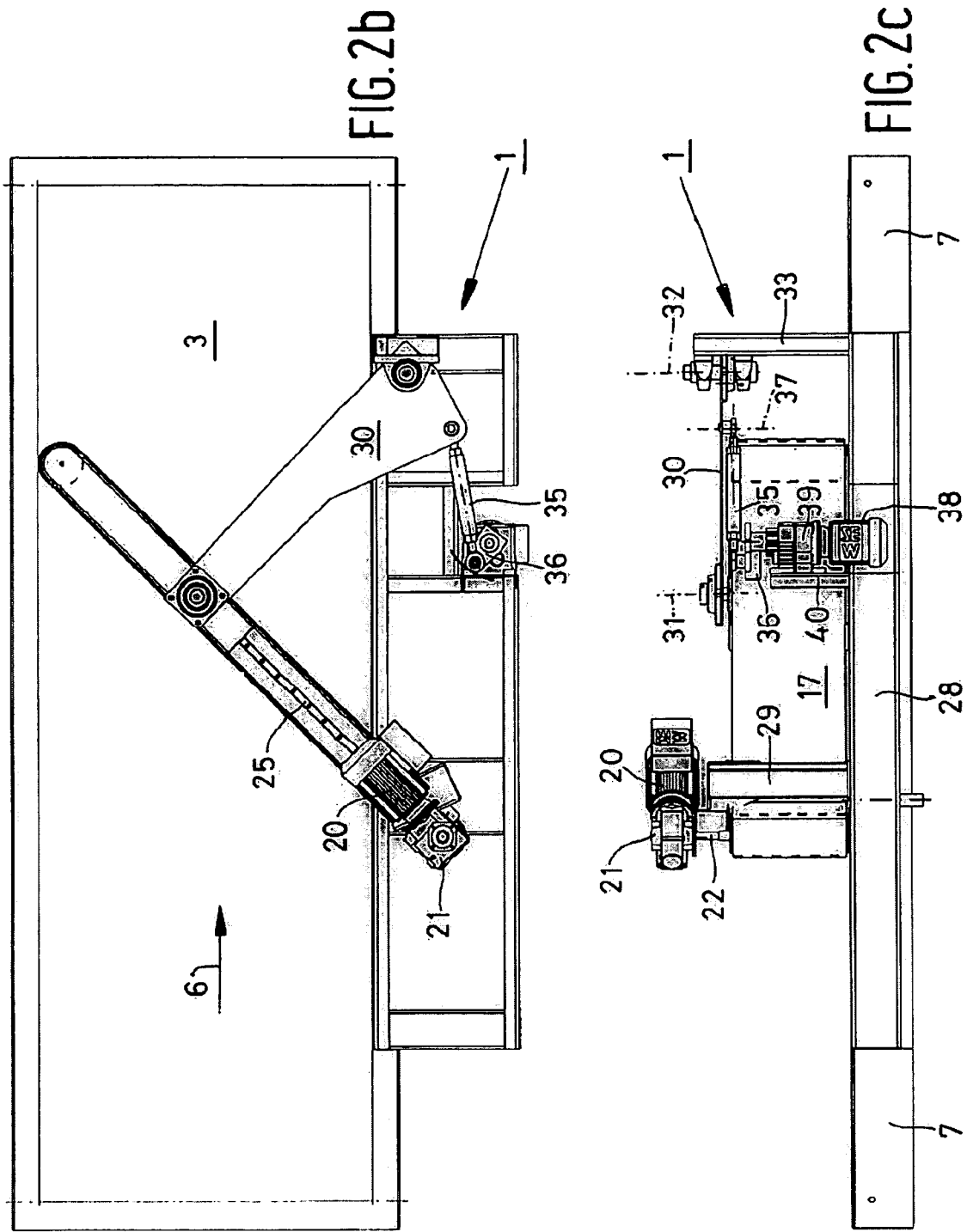

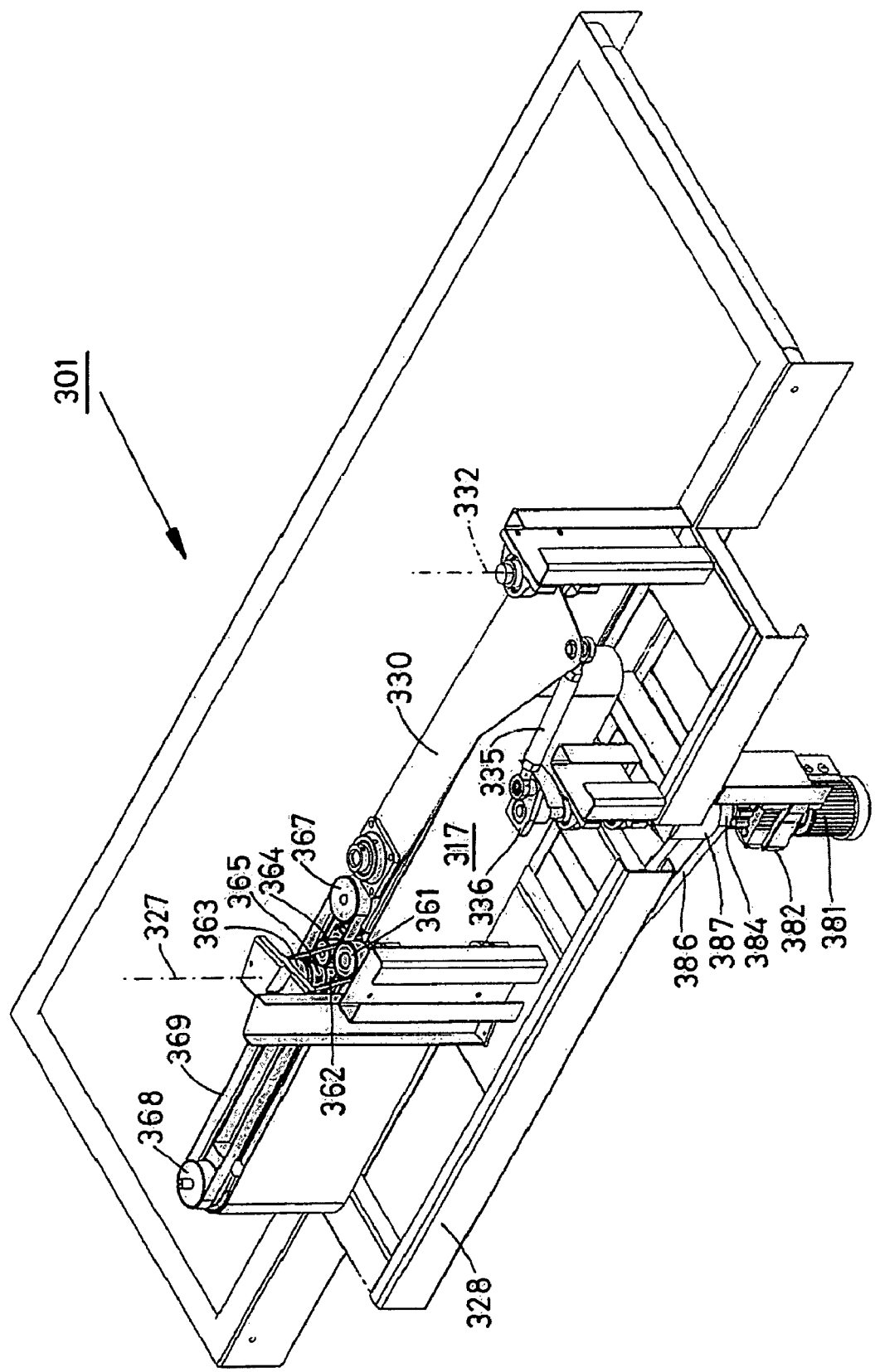

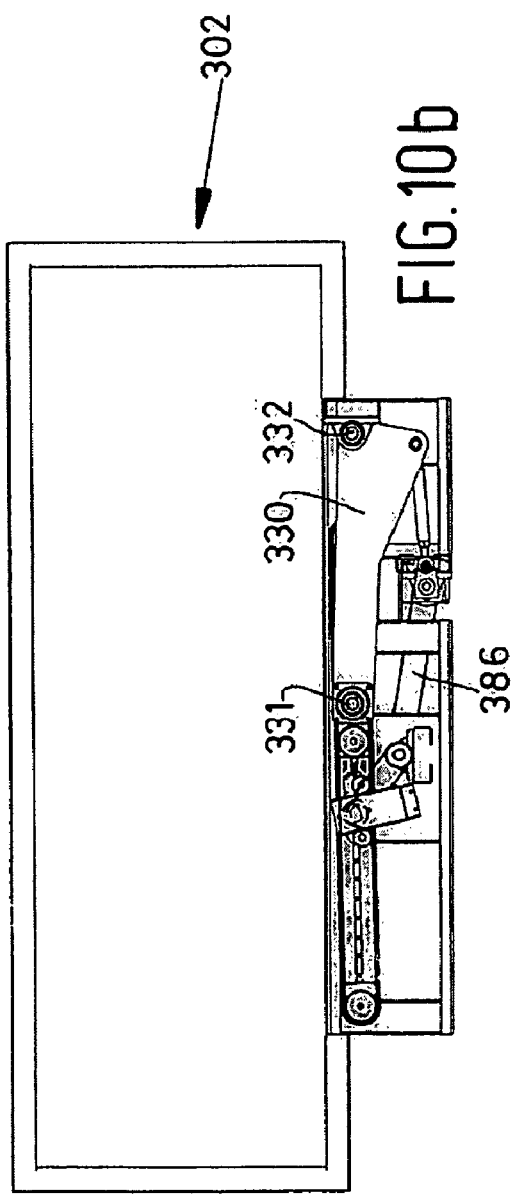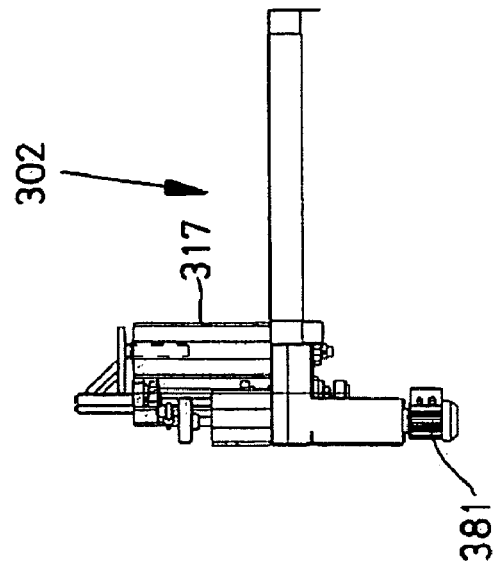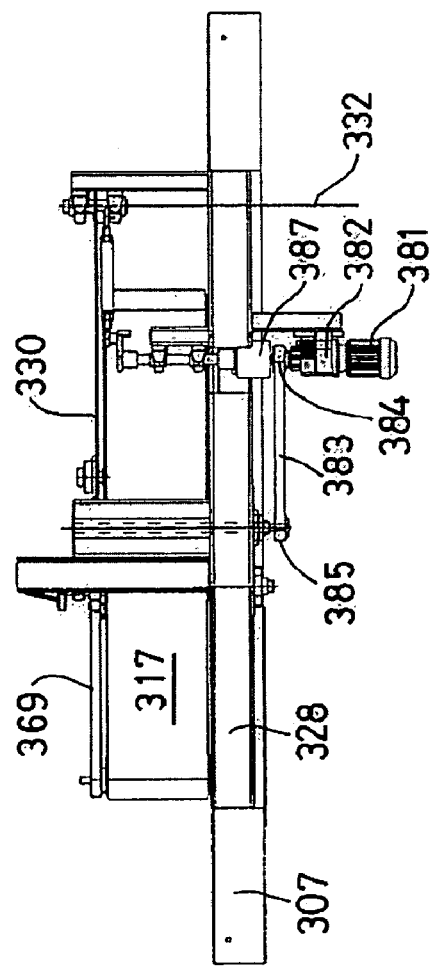

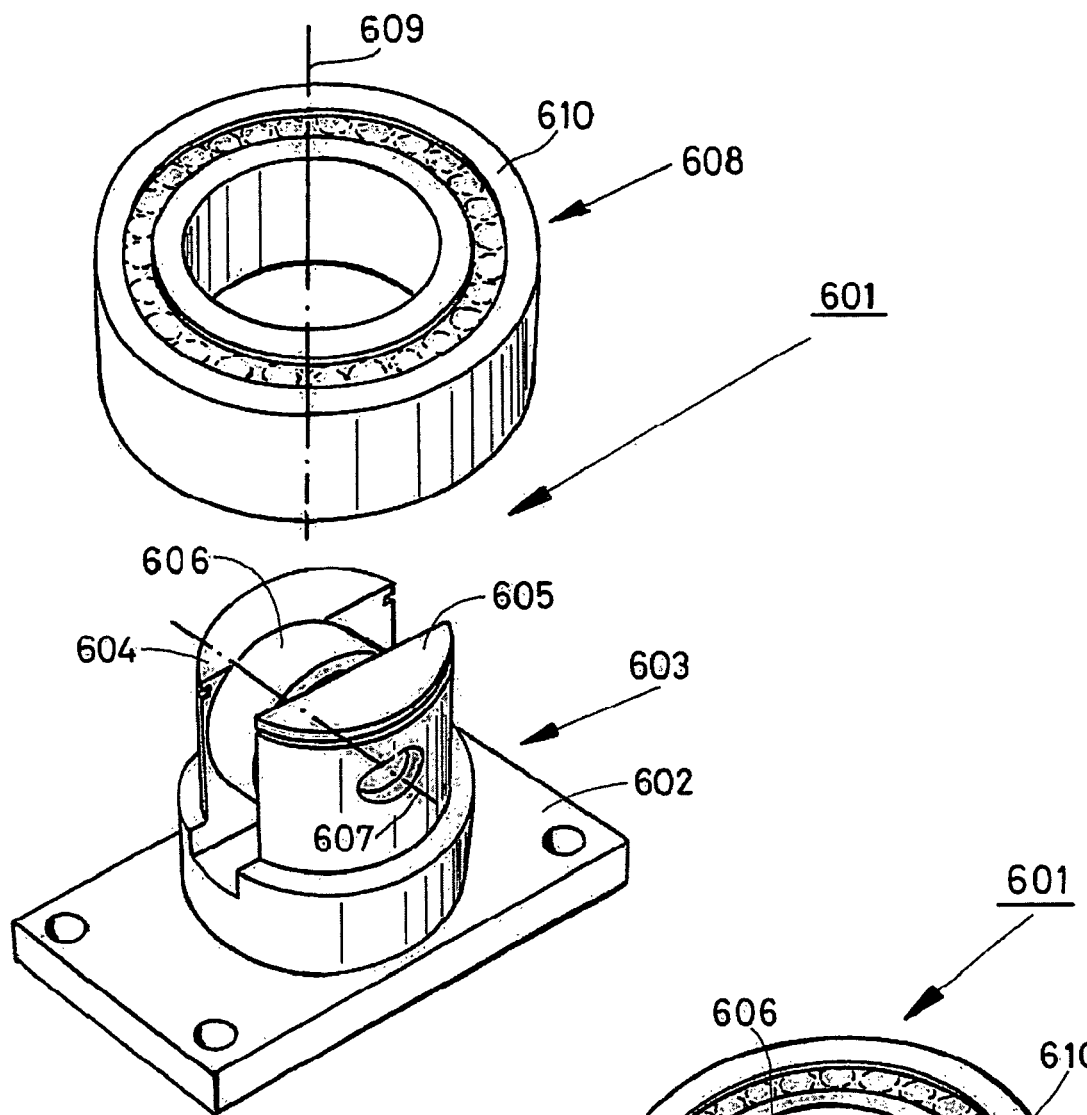
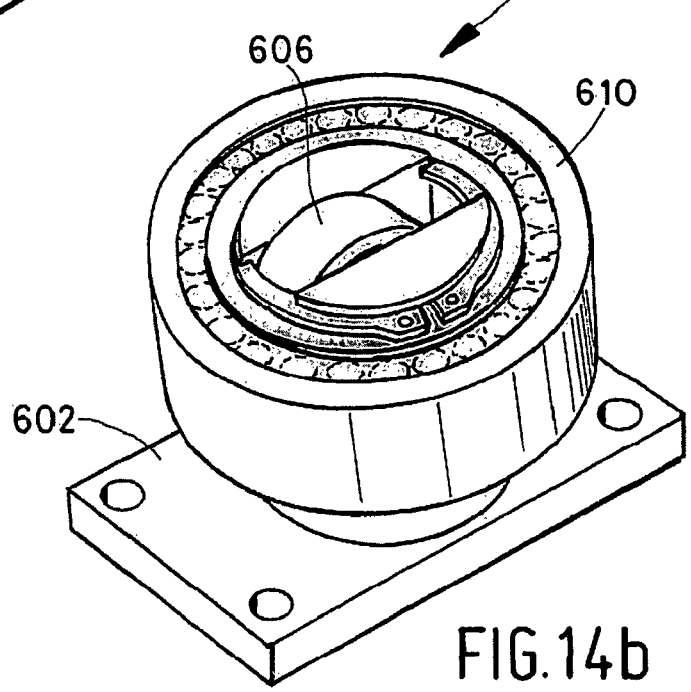
FIG.14a
FIG.14b

DEVICE FOR DIVERTING PRODUCTS SIDEWAYS FROM A CONVEYOR

BACKGROUND OF THE INVENTION

1. Field of the Invention

The present invention relates to a device for selectively diverting products sideways from a load-bearing conveying surface of a conveyor that is moving in a direction of transport.

The device typically includes a frame, an elongated diverter element having an upstream end, a downstream end and a deflecting surface therebetween, pivoting means for pivoting the diverter element in a reciprocal fashion about a vertical pivot axis extending on one side of the conveying surface, between a passive position, in which the diverter element extends beside the conveying surface so as to allow products to pass freely on the conveying surface, and an active position, in which the diverter element extends at least partially above the conveying surface for diverting products present on the conveying surface sideways from said conveying surface, and drive means for driving the deflecting surface with respect to a remaining part of the diverter element at least in the active position.

2. Discussion of the Background Art

An example of a conveying and diverting device is known from U.S. Pat. No. 4,711,357, which discloses a device for sorting parcels or the like. Said device comprises a roller conveyor, along which a diverter arm is positioned. The arm extends parallel to the direction of transport along the roller conveyor in a passive position. The arm pivots about a pivot shaft near an upstream end of the diverter arm to an active position in which the diverter arm extends at an angle of about 45° above the roller conveyor. The diverter arm diverts parcels sideways from a roller conveyor onto a roller conveyor that branches off said roller conveyor at an angle of about 45°. The diverter arm is provided with a vertically oriented, endless belt extending along the length thereof. The belt is passed over two pulleys near the ends of the diverter arm, and is driven for diverting parcels from the conveyor at an accelerated pace. The parcels are loaded less heavily while being in contact with the deflecting surface.

Within the framework of endeavors made to realise an even higher rate of sorting parcels or the like, using a diverter arm fitted with a vertically oriented conveyor belt, it is also known to divide the diverter arm into two parts, as it were, which are arranged on two opposite sides of the conveyor in question. The two parts, in an active position, can be pivoted into alignment with each other. Examples of this are to be found in International patent applications WO-A2-02/14193 and WO-A2-2004/085295. An important drawback of such embodiments is their constructional complexity, as well as the fact that the pivot axis of one of the two sub-arms is present on the side to which the diverting of parcels takes place.

SUMMARY OF THE INVENTION

An object of the present invention is to provide a device as referred to in the introduction, with which it is possible, in spite of the device being of relatively simple construction, to divert products from a conveyor at a high rate and/or to allow a relatively short spacing between successive products. In order to accomplish that object, the device according to one embodiment of the present invention has a pivoting device arranged to translate the diverter element as well during the pivoting movement of the diverter element from the passive position to the active position and vice versa. One benefit of this arrangement, in addition to allowing a pivoting movement, is that the diverter element can also make a translating movement along with the product to be diverted during its movement from the passive position to the active position. Thus, the impact of the deflecting surface on the product to be diverted is reduced. An additional, perhaps even more important advantage is the fact that the conveyor length required to enable the movement of the diverter element between the passive position and the active position can be smaller than in a comparable situation according to the background art because of the fact that the upstream end of the diverter element is moved towards and away from the pivot axis by the pivoting device, thus making it possible to position the products to be diverted closer together and/or to operate the conveyor at a higher speed.

The above advantages can be achieved in particular if the pivoting device is arranged to move the upstream end towards the pivot axis and away from the pivot axis during the pivoting movement of the diverter element from the passive position to the active position and vice versa. Thus the pivoting movement of the diverter element between the passive position and the active position can take place in a compact manner, i.e. within a limited conveyor length.

Preferably, the pivoting device includes an actuating arm which engages the diverter element between the upstream end and the downstream end. The engagement preferably occurs between the pivot axis and the downstream end, on the one hand and the frame on the other hand. The use of such an actuating arm enables not only pivoting movement but also translating movement of the diverter arm in a manner which is constructionally simple. The translating movement does not place a very high mechanical load on the diverter element on account of the movement of the upstream end of the diverter element towards the pivot axis and away from the pivot axis. The load is especially low in the preferred embodiment that is to be described below.

The pivoting device furthermore preferably includes a guide device to slidably guide the diverter element during the pivoting movement of the diverter element between the passive position and the active position. Such a guide device is capable of guiding the movement of the upstream end of the diverter element towards and away from the pivot axis in a constructionally advantageous manner.

The pivot axis preferably takes up a fixed position with respect to the frame, although it is also possible within the framework of the present invention for the pivot axis to undergo a spatial movement towards and away from the upstream end of the diverter element during said pivoting. For constructional reasons it is generally preferable, however, for the pivot axis to take up a fixed position.

According to one non-limiting embodiment, the drive device includes a transmission element that is rotatable about a vertical axis of rotation, which coincides with the pivot axis. This makes it possible in an advantageous manner for the driving motor to be connected to the frame rather than being fixed to the diverter element.

In particular in combination with the preceding preferred embodiment, the drive device preferably includes a motor that is fixed or connected to the frame. Thus no mass inertia forces caused by spatial movement of the motor will occur during pivoting of the diverter element. Otherwise such mass inertia forces might make it necessary to use a stronger construction for the device.

Alternatively it is, according to one exemplary embodiment, possible for the drive device to comprise a motor that is fixed or connected to the diverter element. The advantage of such an embodiment is that a transmission from the stationary construction or the frame to the diverter element for driving the deflecting surface is not required.

In one embodiment, the pivoting device and the drive device include a common motor for operating the pivoting device and the drive device. Thus a single motor will suffice, which motor effects the pivoting of the diverter element as well as the driving of the deflecting surface.

In one non-limiting embodiment, the pivoting means includes a transmission that can be engaged and disengaged. Such a transmission makes it possible for the pivoting means and the drive means not to be operative at the same time, which may be desirable, for example, if the diverter element, once it has reached the active position, must remain in that position for some time before returning to the passive position. For example, a clutch-brake mechanism as known to those skilled in the art may be used advantageously as a transmission that can be engaged and disengaged.

The deflecting surface is typically made up of a vertically oriented diverter belt, which is passed over at least two pulleys that are rotatable about vertical axes of rotation.

To prevent products from passing the downstream end of the diverter element without actually being diverted, in an active position of the diverter element, the deflecting surface preferably extends perpendicularly to the direction of transport over at least 80% of the width of the conveying surface in the active position. In other words, the path taken by the products on the conveying surface is approximately 80% obstructed by the diverter element. It will be understood by those skilled in the art that the eventual minimum percentage depends at least partially on the dimensions of the products being handled on the device according to the invention. The larger the dimensions of the products, the lower the percentage in question may be. It should be realised in this connection that the lower the percentage of the dimensions of the conveying surface along which the deflecting surface extends perpendicularly to the direction of transport in the active position, the more limited the conveyor length, seen in the direction of transport, that will be occupied during the movement of the diverter element between the passive position and the active position, as a result of which it will be possible to select an even smaller spacing between the products to be diverted and/or to operate the conveyor at a higher conveying speed.

To be absolutely sure that products, irrespective of their dimensions, will be diverted from the conveying surface in the active position of the diverter element, the deflecting surface may extend perpendicularly to the direction of transport over the full dimensions of the conveying surface in the active position. In other words, the deflecting element obstructs substantially the entire path of the products on the deflecting element. Of course, the deflecting element may be at various angles to the path of the product on the conveying device besides a right angle.

BRIEF DESCRIPTION OF THE DRAWINGS

The invention will now be explained in more detail by means of the description of multiple non-limiting embodiments of a device according to the invention, in which reference is made to the following figures:

FIGS. 1a, 1b and 1c are a perspective view, a top plan view and a side view, respectively, of a first embodiment of a device according to the invention in a passive position thereof;

FIGS. 2a, 2b and 2c are corresponding views of the first embodiment of the device in an active position thereof;

FIGS. 9, 10a, 10b and 10c are a perspective view, a side view, a top plan view and a rear view, respectively, of a fourth embodiment of a device according to the invention in a passive position thereof;

FIGS. 14a and 14b are an exploded view and a normal view, respectively, of a preferred embodiment of a bearing assembly that can be used for guiding a diverter arm with respect to a frame of a device according to one non-limiting embodiment of the invention;

DETAILED DESCRIPTION OF THE INVENTION

Figure 1A:
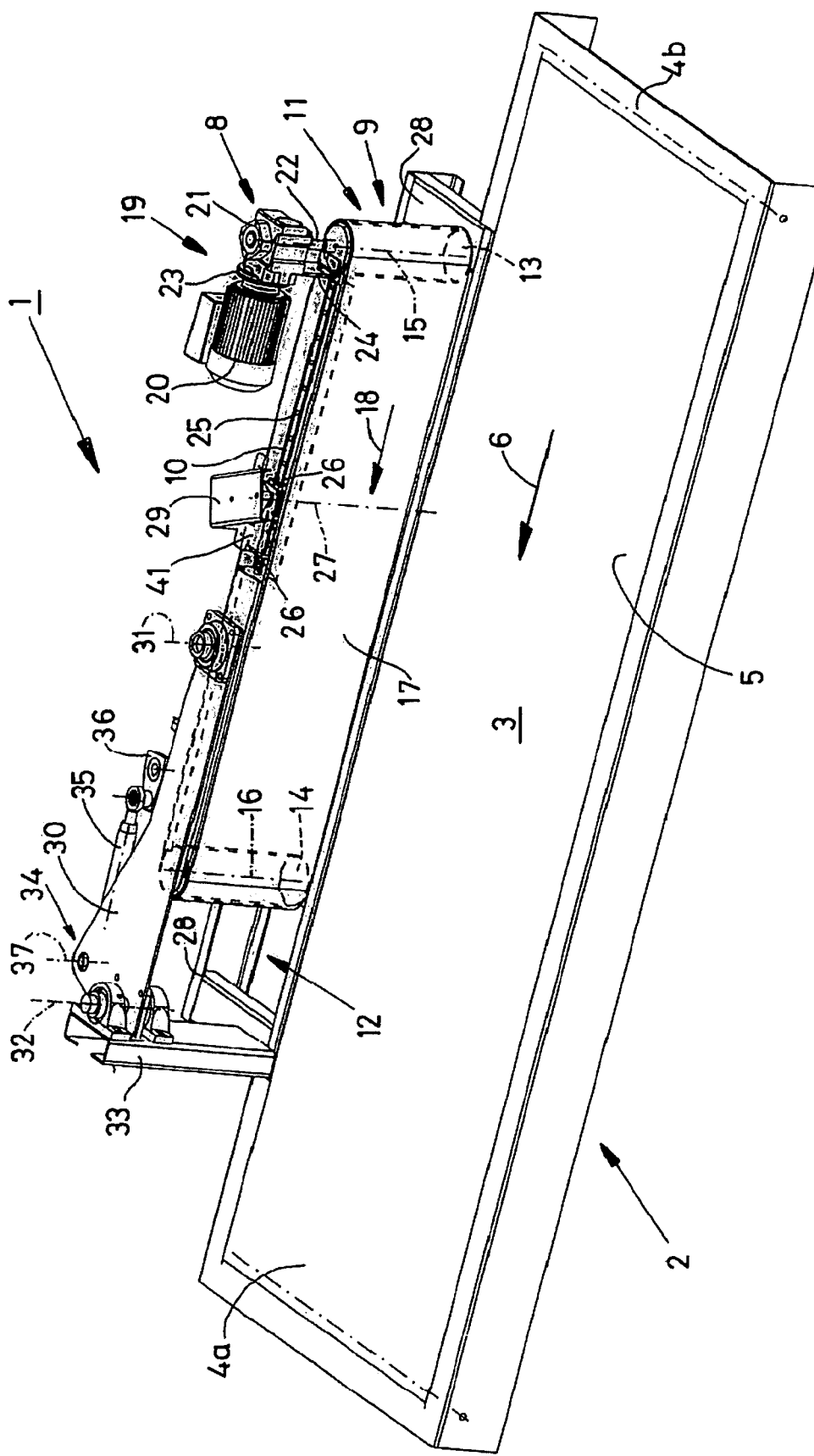

FIGS. 1a-1c and FIGS. 2a-2c are various views of a selective diverting device 1 according to a first non-limiting embodiment of the invention in, respectively, a passive position and an active position thereof. The diverting device 1 comprises a conveyor 2 (schematically shown) having a load-bearing conveying surface 3 formed by the upper side of the upper half of a conveyor belt 5 that is passed over two horizontal rotatable pulleys (not shown in FIGS. 1a and 1b), which conveyor belt is driven in the direction of transport 6 by drive means (not shown). The width of the conveyer 2 is its dimension along its axis of rotation. The pulleys are rotatably mounted (about horizontal axes of rotation 4a, 4b) in a fixed frame 7 of the conveyor 2.

A diverting unit 8 is provided on one side of the conveyor 2. The diverting unit 8 comprises a diverter arm 9, which typically includes an elongated frame 10 that defines an upstream end 11 and a downstream end 12 of the diverter arm 9. The diverter arm 9 is furthermore provided with pulleys 13, 14 at the upstream end 11 and the downstream end 12, respectively. The pulleys are rotatable about vertical axes of rotation 15, 16 with respect to the frame 10. An endless vertically oriented diverter belt 17 is passed over the pulleys 13, 14. Said belt a 17 can be driven in the driving direction 18 by actuating a drive unit 19 comprising an electric motor 20 and a right-angled transmission 21, the outgoing shaft 22 of which is coupled to the pulley 13. The electric motor 20 and the right-angled transmission 21 are interconnected via a flanged connection 23, whilst the right-angled transmission 21 is connected to the frame 10 via a bracket 24. Alternatively, the pulley may be substituted for a tubular motor, as a result of which the electric motor 20 and the transmission 21 on the upper side of the diverter arm 9 are no longer needed.

Two guide strips are typically fixed to the frame 10. Said guide strips typically extend from the pulley 13 in the direction of the pulley 14 along approximately half the length of the frame 10. Only the upper guide strip 25 is shown in the figures, whilst another guide strip may furthermore be present at the bottom side of the frame 10. The other guide strip is typically the mirror image of the guide rail 25, seen in a horizontal plane of reflection halfway up the height of the frame 10. The guide strips 25 are typically slidably accommodated (in the longitudinal direction of the diverter arm 9) in an upper sliding element 41 comprising guide shoes 26. A corresponding construction comprising a lower sliding element and lower guide shoes arranged to mate with the lower guide strip is used at the bottom side. The sliding element 41, and thus also the diverter arm 9, is pivotable about the pivot axis 27 with respect to the frame 28 of the diverting unit. The frame 28 itself is in turn fixed to the frame 7 of the conveyor 2. To enable pivoting movement of the diverter arm 9 about the pivot axis 27, the frame 28 comprises a frame bracket 29 that is fixed to the remaining part of the frame 28, in which a pivot hub that extends upwards from the sliding element 41, whose central axis coincides with the pivot axis 27, is pivotally accommodated. In a comparable manner, the lower sliding element is provided with a downwardly extending pivot hub in line with the pivot hub of the sliding element 41, which is pivotally accommodated in the frame 28.

An actuating arm 30 is typically provided for pivoting the diverter arm 9 about the pivot axis 27 and at the same time moving the diverter arm 9 in the longitudinal direction of the diverter arm 9 with respect to the guide shoes 26. Said actuating arm 30 pivotally engages (about the vertical pivot axis 31) the frame 10 with one end whilst being pivotally connected (about the vertical pivot axis 32) to the upright 33 of the frame 28 at an opposite end. One end of a connecting rod 35 of a crank-connecting rod mechanism comprising a crank 36 pivotally engages (about the vertical pivot axis 37) a corner point 35 of the actuating arm 30 located relatively close to the pivot axis 32. The crank 36 is rotated via the transmission 39 when the electric motor 38 is actuated by control means (not shown). The motor-transmission 38-39 combination is typically rigidly connected to the frame 38 via the upright 40 of the frame.

Figure 2A:
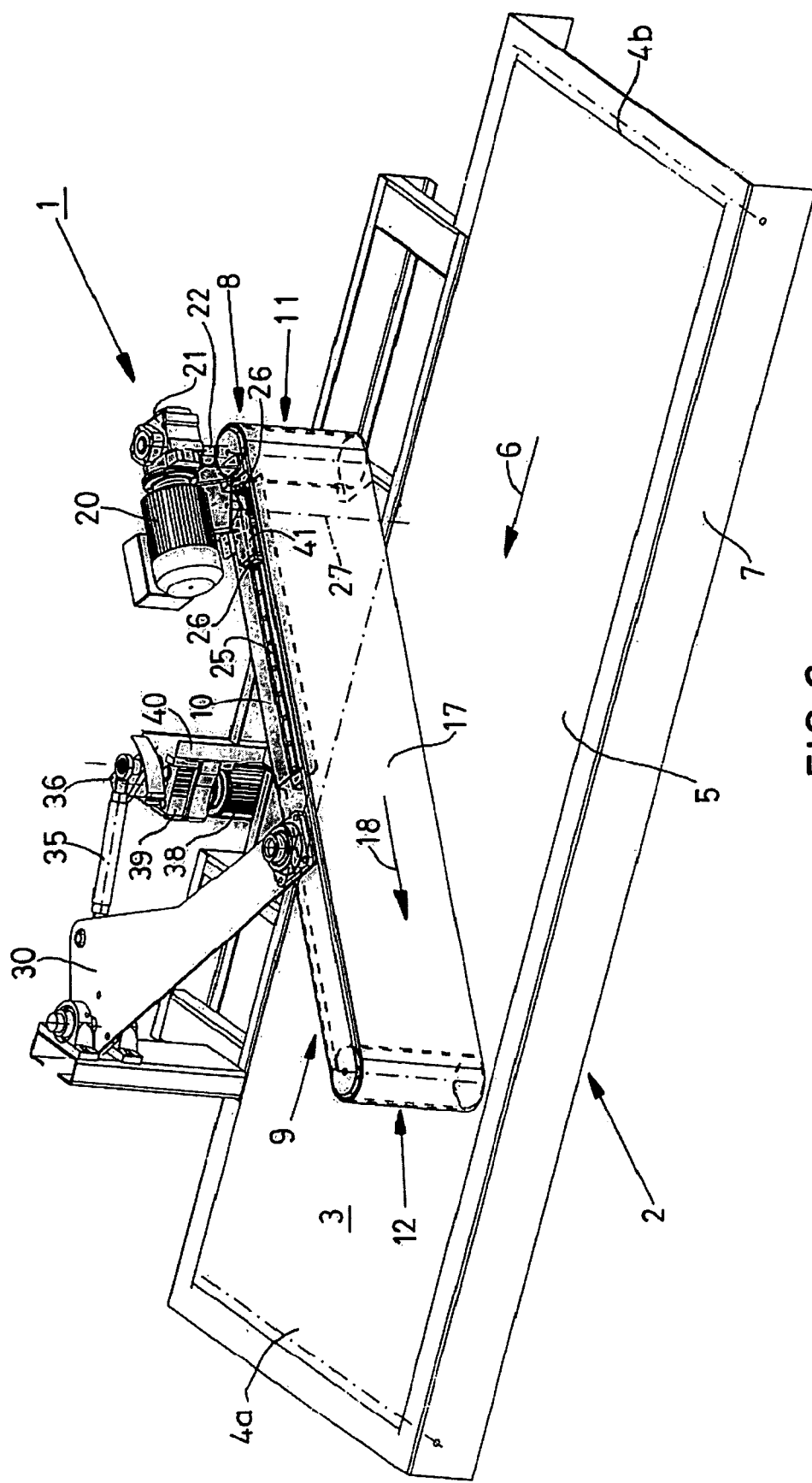

The diverting device functions as follows: as soon as the control system detects that a product that is to be diverted from the conveyor 2 on the side opposite the diverting unit 8 is approaching the diverting device 1, the driving motor 40 is actuated, causing the crank to rotate a half turn at first. The actuating arm 30 pivots about the pivot axis 32, thereby imposing a pivoting movement about the pivot axis 27 on the diverter arm 9, whilst also the diverter arm 9 with the guide rail 25 will slide along guide shoes 26. As a result, the upstream end 11 of the diverter arm 9 will be positioned closer to the pivot axis 27 until the situation as shown in FIGS. 2a-2c is reached, in which the diverter arm 9 extends the entire width of the deflecting surface 5. It is important in this connection to note that, in the active position, the downstream end 12 of the diverter 9 will be present at practically the same position as in the passive position, seen in the direction of transport 6.

At approximately the same time the electric motor 20 will be actuated by the control means, as a result of which the diverter belt 17 is driven in the direction of movement 18. After the product in question that is to be diverted has come into contact with the diverter belt 17, it will be discharged in the direction of the downstream end 12 of the diverter belt 17, assisted by the fact that said belt is driven, to be transferred further, for example by another conveyor that branches off the conveyor 2. It is emphasized in this regard that the pivoting of the diverter arm 9 about the pivot axis 27 can be synchronized with the arrival of a product to be diverted in such a manner that the contact between the product to be diverted and the diverter belt 17 will take place during the pivoting movement of the diverter arm 9 from the passive position that is shown in FIGS. 1a-1c to the active position that is shown in FIGS. 2a-2c. In addition, it is noted that the actuation of the electric motor 20 upon pivoting of the diverter arm 9 from the passive position to the active position takes place optionally, and that alternatively it is possible for the electric motor to be continuously actuated, so that start-stop situations do not occur with the diverter belt 17.

After the product in question has been discharged from the conveying surface 3, the driving motor 40 can rotate the crank 36 a second half turn further so as to return the diverter arm 9 from the active position to the passive position. A major advantage of the fact that the product to be diverted already comes into contact with the diverter belt 17 upon pivoting of the diverter arm 9 from the passive position to the active position is that, because of the accelerated discharge as a result of the operation of the drive in the diverter belt 17, the crank 36 can make a full turn without having to stop in the interim. On the other hand it is possible within the framework of the present invention for the crank 36 to stop temporarily after a half turn by stopping the electric motor 38 temporarily. This sequence may be desirable, for example, when a number of successive parcels present on the conveying surface 3 are to be diverted by the diverter arm 9.

FIGS. 3a, 3b and 4a, 4b show a second non-limiting embodiment of the diverting device 101 in the passive position and in the active position, respectively. In the description of the diverting device 101 below especially the differences with the diverting device 1 will be discussed. Parts of the diverting device 101 corresponding to or at least being comparable to parts of the diverting device 1 will be indicated by the same numerals, augmented by 100. For the sake of clarity the diverter belt 117 is not shown in FIGS. 3b and 4b.

The diverting device 101 is different from the diverting device 1 in particular as regards the manner in which the diverter belt 117 of the diverter arm 109 is driven. The diverter belt of the diverting device 1 is driven by means of the electric motor 20, which is rigidly connected to the frame 10 of the diverter arm 9, as a result of which the electric motor 20 and the associated right-angled transmission 21 jointly pivot about the pivot axis 21 with the remaining part of the diverter arm 9. This arrangement may involve additional mass inertia effects. The diverting device 101 uses an electric motor 120 and a right-angled transmission 121 that are fixed to the frame 128 of the diverting unit 108 via the frame bracket 129.

Figure 6:
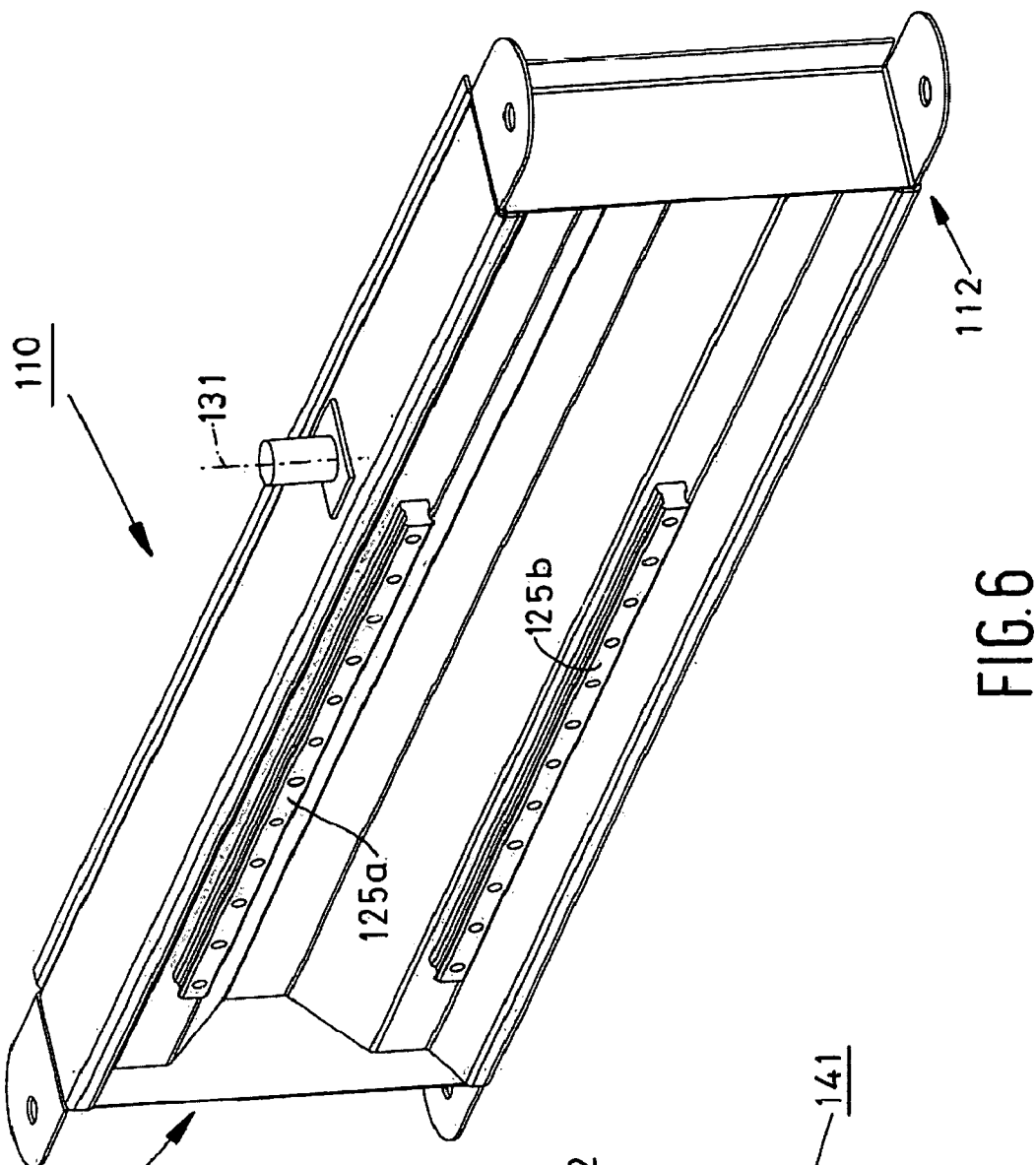
FIG. 6 is a perspective view of the frame of the diverter arm as used in the second embodiment of the device.
Figure 5:
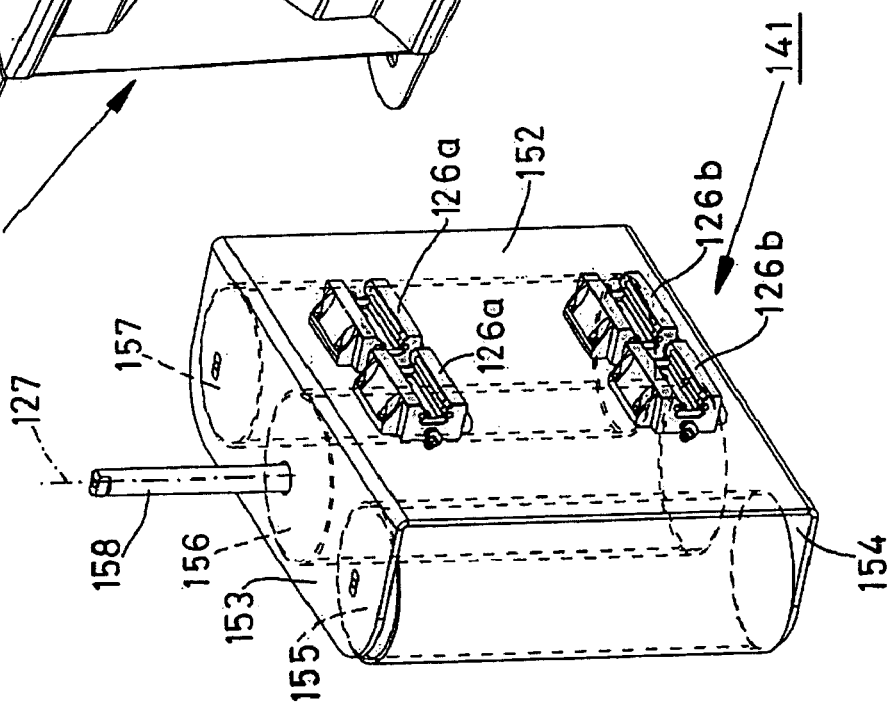
FIG. 5 is a perspective view of a sliding element as used in the second embodiment of the device.

For a correct understanding of the operation of the diverting device 101 reference should first be made to FIGS. 5 and 6. FIG. 6 shows the frame 110 of the diverting arm 109 with the upstream end 111 and the downstream end 112. On the side remote from the conveyor 102, the frame 110 is provided with an upper guide rail 125a and a lower guide rail 125b, which guide rails extend parallel to each other. The guide rails 125a and 125b are arranged to mate with the sliding element 141, more specifically with the guide shoes 126a and 126b thereof, which typically are mounted on the back of a plate 152 that is curved to a C-shape. Three pulleys 155, 156, 157 are typically rotatably mounted (about their respective central axes) between the parallel, horizontally oriented legs 153, 154 of the C-shaped plate 152 that faces away from the guide shoes 126a, 126b. A shaft that is rigidly connected to the pulley 156 typically extends from the middle pulley 156 through a hole in the leg 153, which shaft is coupled to or is made up of the outgoing shaft of the right-angled transmission 122 in assembled condition.

Figure 3A:
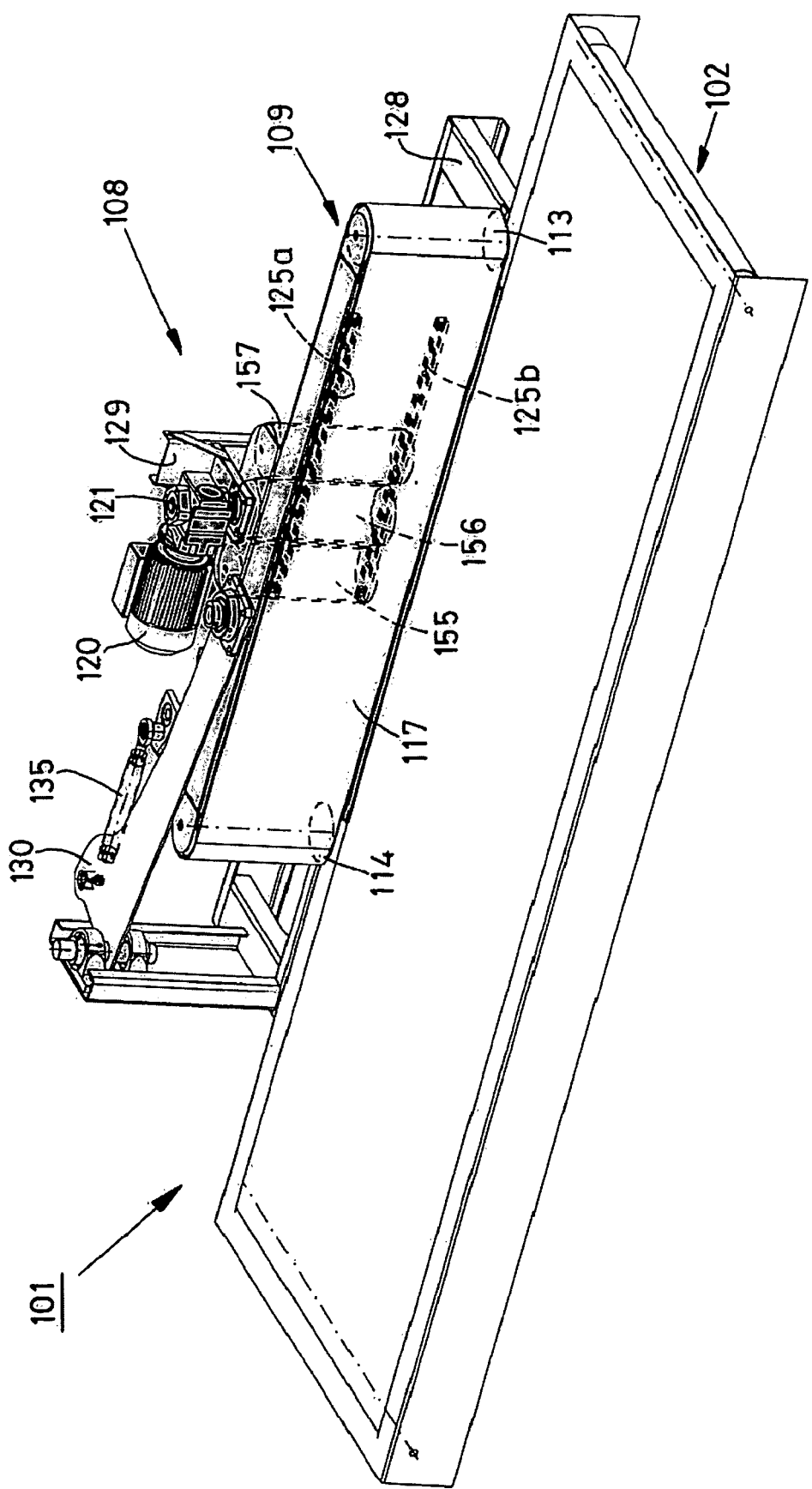
FIGS. 3a and 3b are two different perspective views of a second embodiment device according to the invention in a passive position thereof.
Figure 3B:
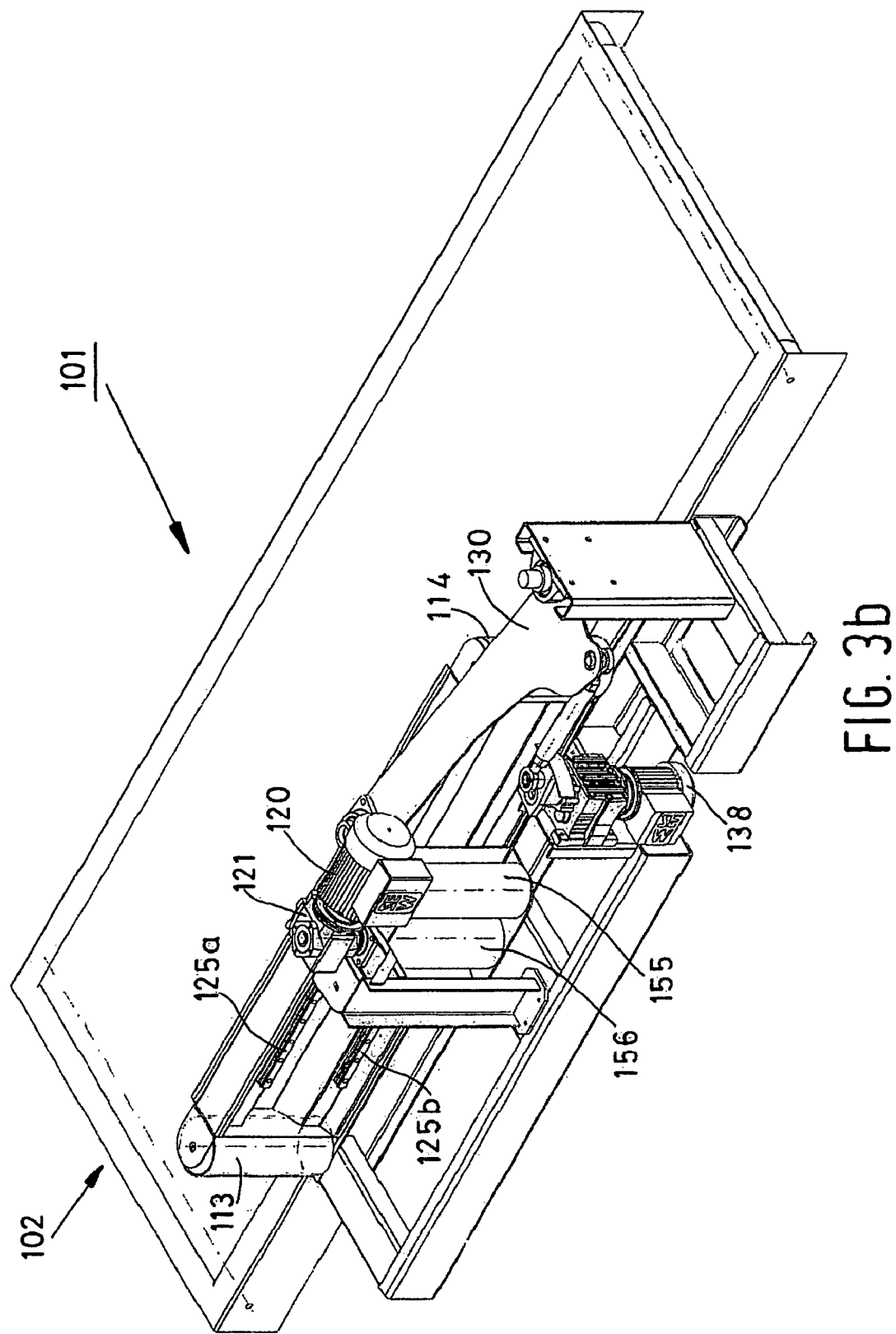
Figure 4A:
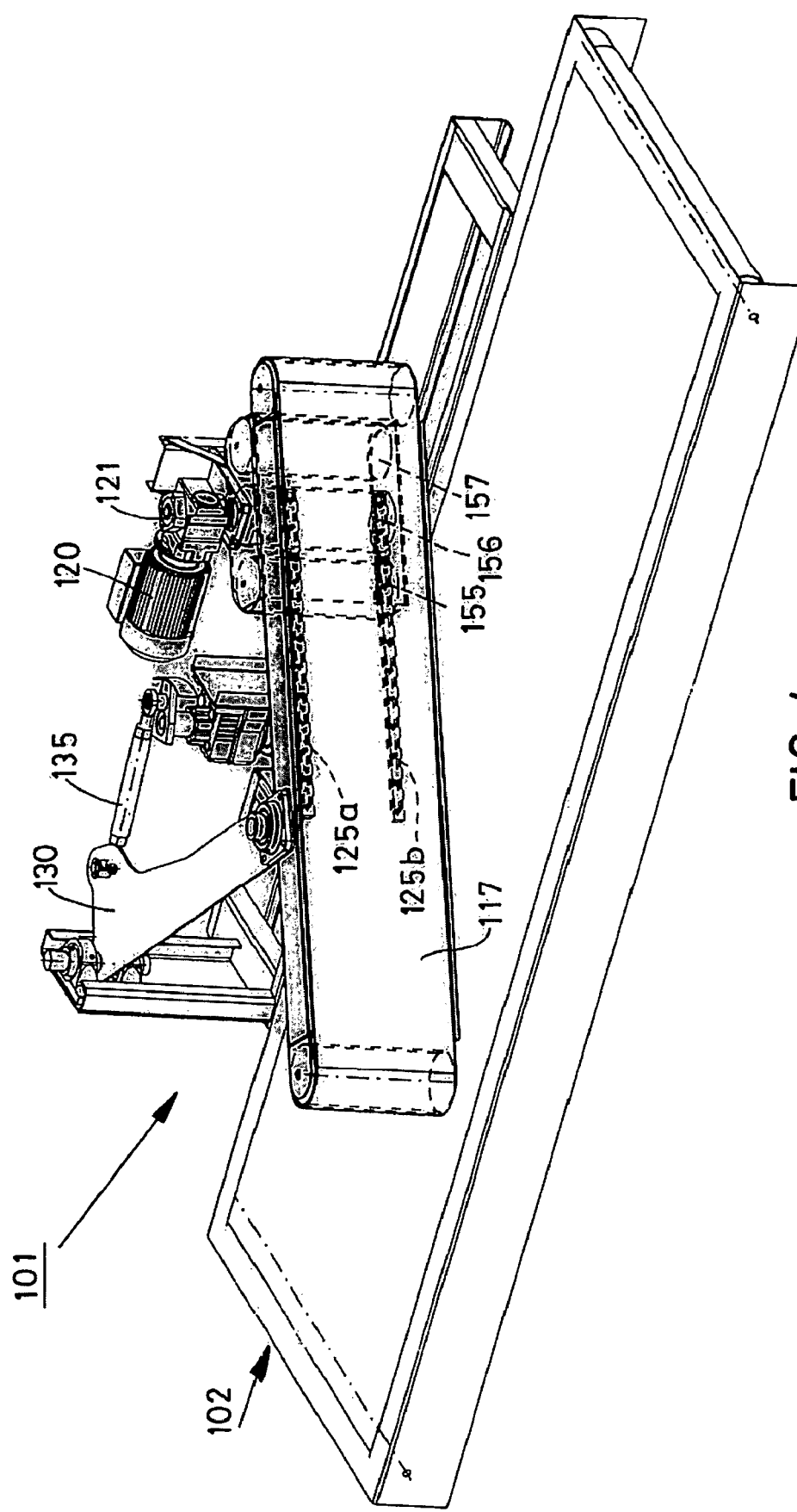
FIGS. 4a and 4b are corresponding views of the second embodiment of the device in an active position thereof.
Figure 4B:
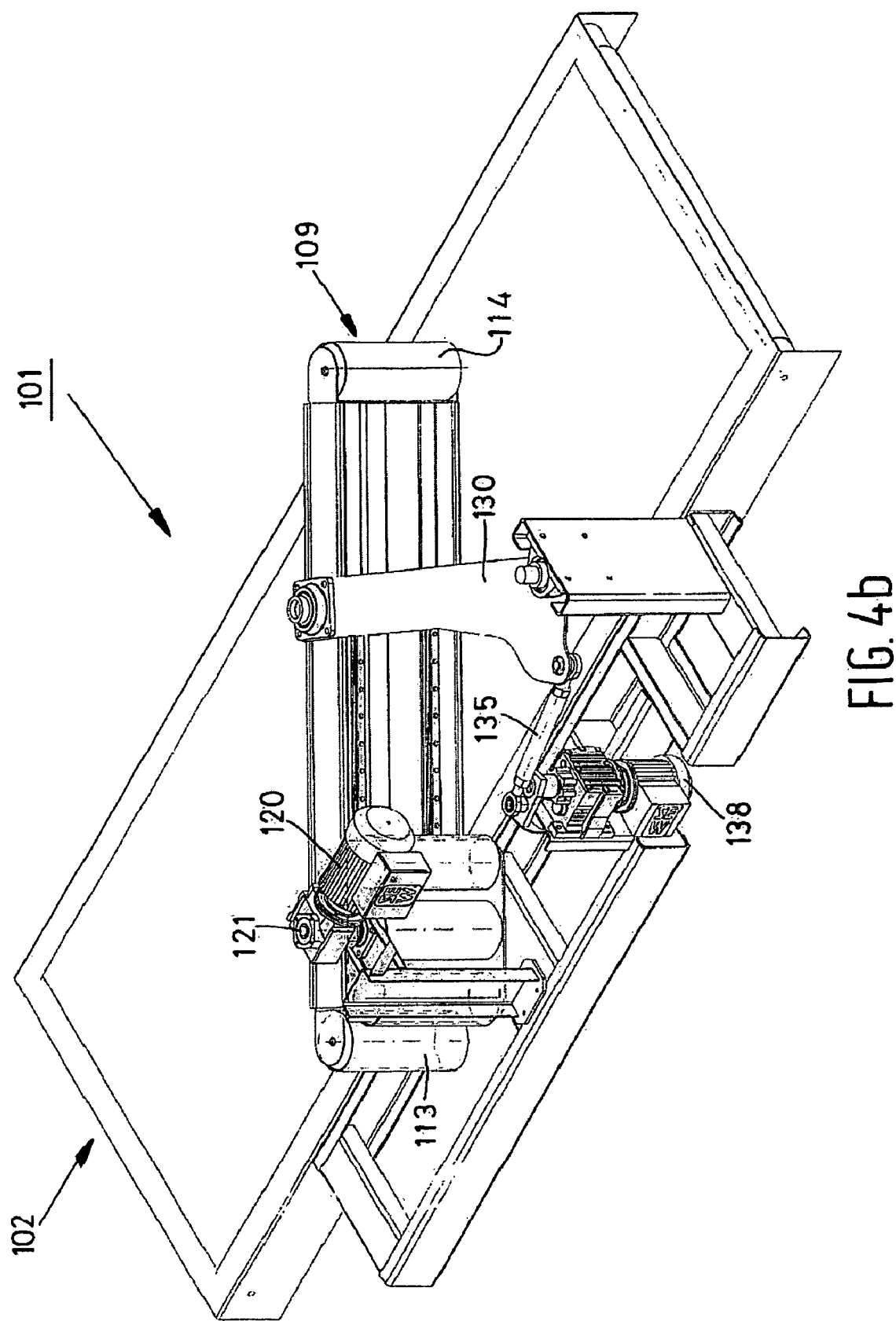

The diverter belt 117 which, as will be understood by those skilled in the art, needs to be tensioned by tensioning means (not shown), is passed not only over the pulleys 113, 114 of the diverter arm 109, but also (in zigzag fashion) over the successive pulleys 155, 156, 157, with the diverter belt 117 extending on the side of the middle pulley 156 remote from the conveyor 102. The parts of the diverter belt 117 that extend between the pulley 113 and the pulley 157 and between the pulley 155 and the pulley 114 thus extend parallel to the part of the diverter belt 117 that extends between the pulley 113 and the pulley 114 on the side that faces towards the conveyor 102. The central axis of the shaft 158 also forms the pivot axis 127 about which the diverter arm 109 pivots between the passive position as shown in FIGS. 3a, 3b and the active position as shown in FIGS. 4a, 4b upon actuation of the electric motor. An important advantage of the diverting device 101 in comparison with the diverting device 1 is the fact that the electric motor and the associated right-angled transmission 121 are rigidly connected to the frame 128, and consequently need not pivot along with the diverter arm 109.

Figure 7:
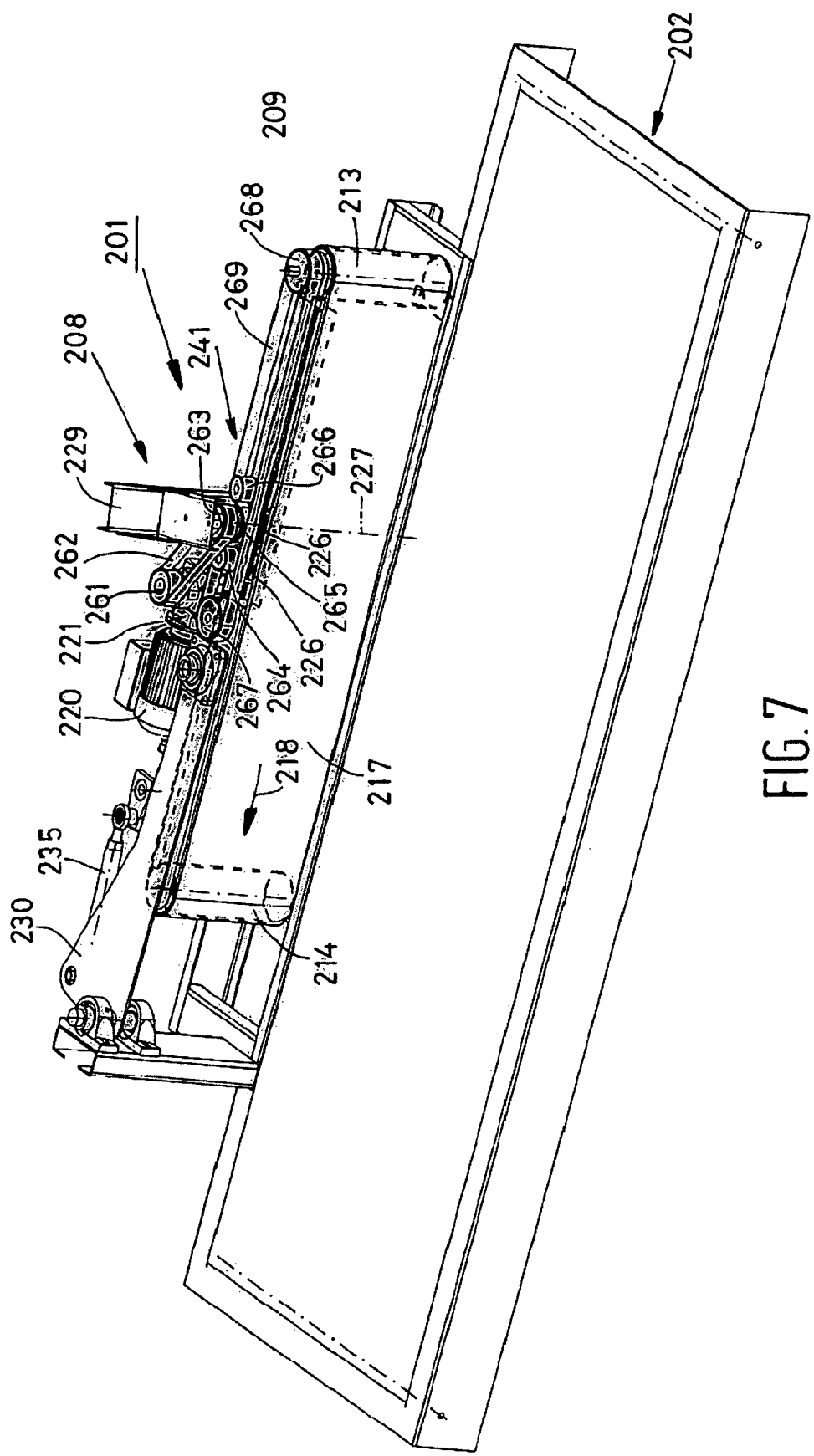
FIG. 7 is a perspective view of a third embodiment of a device according to the invention in a passive position thereof.
Figure 8:
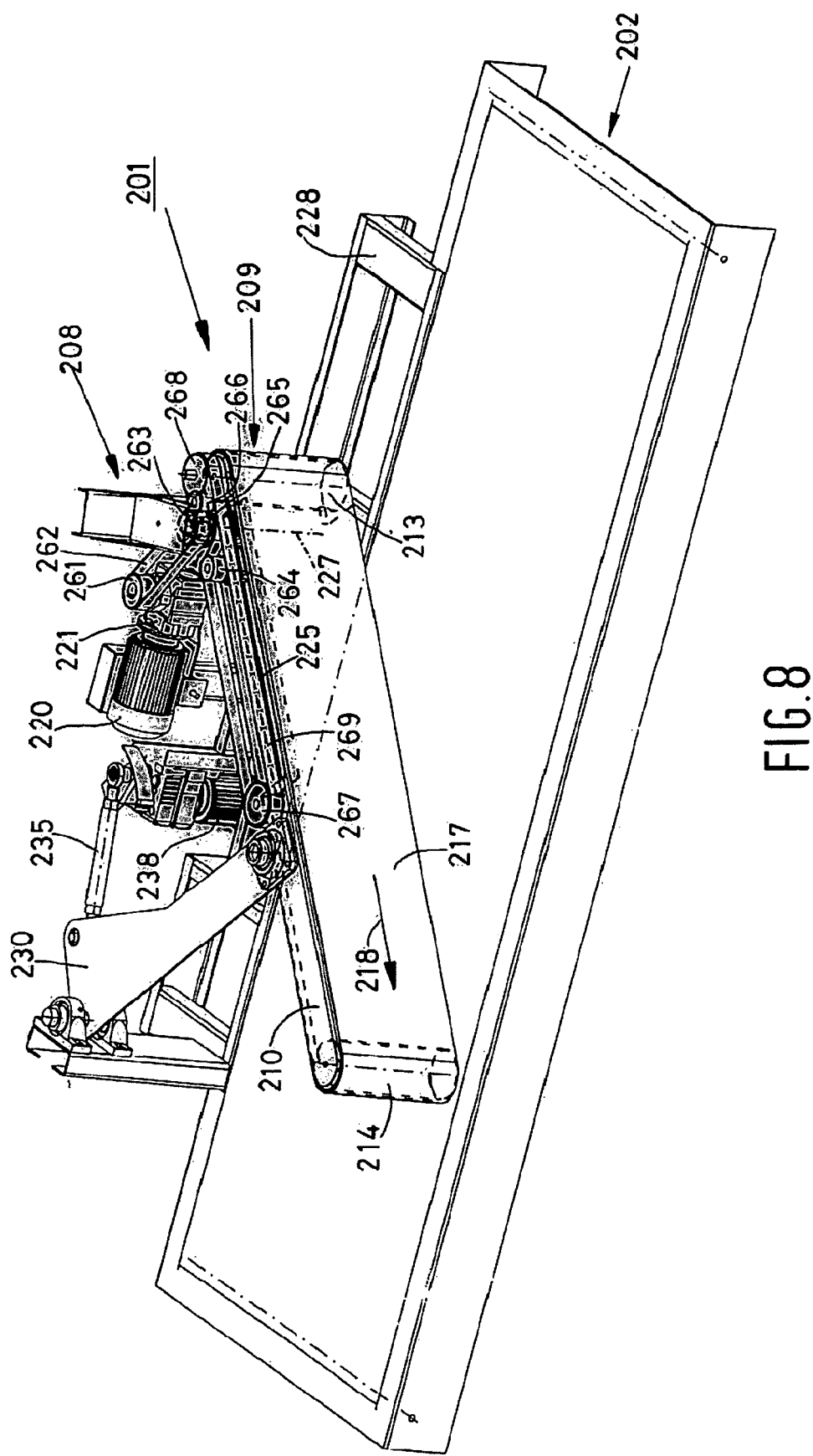
FIG. 8 is a corresponding view of the third embodiment of the device in an active position thereof.
Figure 11:
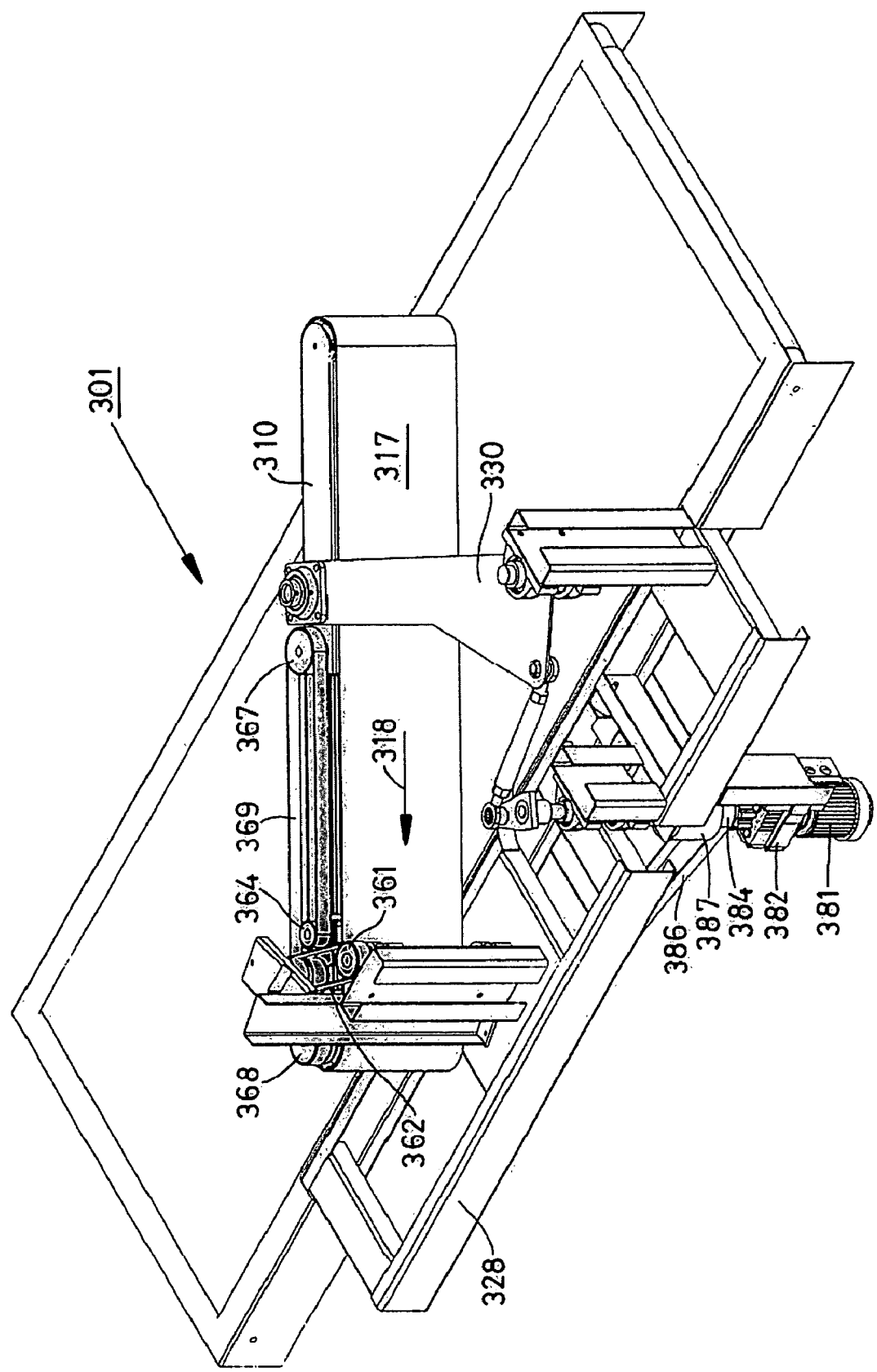
FIGS. 11, 12a, 12b and 12c are corresponding views of the fourth embodiment of the device in an active position thereof.
Figure 12C:
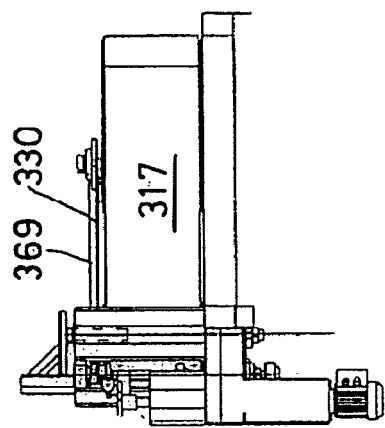
Figure 12B:
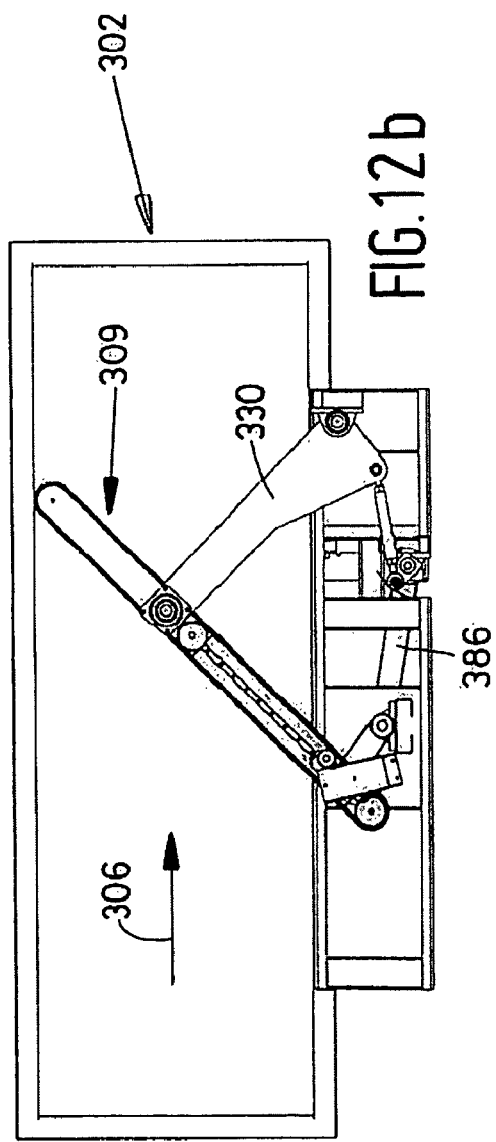
Figure 12A:
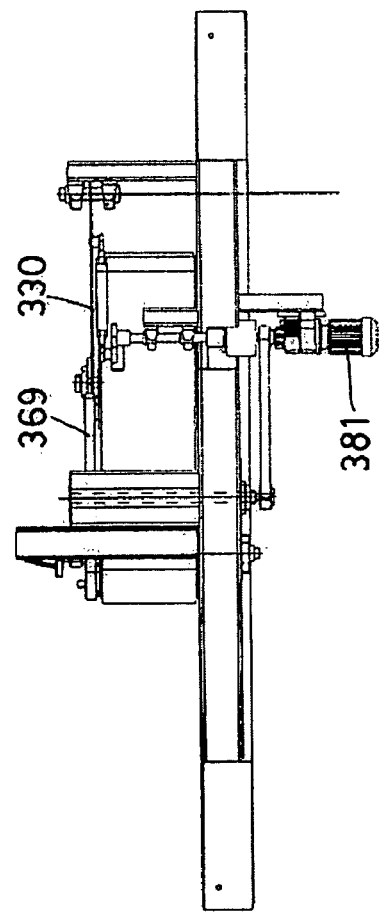

FIGS. 7 and 8 show a diverting device 201 in a passive position and in an active position, respectively, which diverting device, just like the diverting device 101, shows a great deal of resemblance with the diverting device 1 as described in great detail above, so that a detailed description of the diverting device 201 is not needed and the description hereinafter is in particular concentrated on the differences with the diverting device 1 and the diverting device 101. Parts of the diverting device 201 that correspond to or at least are comparable to parts of the diverting device 1 will be indicated by the same numerals, augmented by 200, however.

The diverting device 201 is different from the diverting devices 1 and 101 as regards the manner in which the diverter belt 217 is driven in the driving direction 218. To that end the electric motor 220 is provided, which motor, just like the electric motor 120 of the diverting device 101, is typically fixed or attached to the frame 228 of the diverting unit 208. The electric motor 220 typically drives the pulley 261 via a right-angled 15 transmission 221 comprising a vertical outgoing shaft. An endless transmission belt 262 is passed over the pulley 261 and pulley 263. The central axis of the pulley 263 forms the pivot axis 227 for the pivoting movement of the driving arm 209. Partially as a result thereof, the pulleys 261 and 263 as well as the transmission belt 262 take up a fixed spatial position during the pivoting movement of the driving arm 209.

The diverter arm 209 is provided with a sliding element 241 fitted with guide shoes both at the upper side and at the lower side of the diverter arm 209, of which guide shoes only the upper guide shoes 226 are partially shown in FIGS. 7 and 8. At the upper side, the sliding element 241 is provided with three pulleys 264, 265, 266 that are rotatable about vertical axes of rotation, of which pulleys the middle pulley 265 is aligned with the pulley 263, being capable only of joint rotation therewith. The sliding element 241 is pivotable about the pivot axis 227. The guide shoes 226 of the diverter arm 209 enable movement of the remaining part of the diverter arm 209, more specifically the frame 210 thereof, in the longitudinal direction of the diverter arm 209 with respect to the sliding element 241 on account of the interaction between the guide shoes 226 and an upper guide rail 225 and a lower guide rail (not shown). This movement is quite comparable to the guide rails used in the diverter arm 9 of the diverting device 1. The diverter arm 209 is furthermore provided with pulleys 267 and 268 at the upper side thereof. The pulleys are rotatably connected (about vertical axes of rotation) to the frame 210 of the diverter arm 209. The pulley 268 is rigidly connected to the pulley 213. Therefore the pulley 268 and the driving pulley 213 can only rotate jointly about their common axis. Finally, the diverter arm 209 is provided with a transmission belt 269, which is passed over the respective pulleys 268, 269, 264, 265 and 266. When the electric motor 220 is suitably actuated, the diverter belt 217 will be driven in the driving direction 218 via the transmission belts 262 and 269, irrespective of the pivoted position of the diverter arm 209. Said pivoting of the diverter arm 209 takes place in a manner which is similar to the manner in which the diverter arms 109 and 9 are used in the diverting devices 101 and 1, with respect to the actuating arm 230, the connecting rod 235 and the electric motor 238.

FIGS. 9, 10a, 10b, 10c and FIGS. 11, 12a, 12b, 12c show a diverting device 301 according to a fourth non-limiting embodiment of a device according to the invention in a passive position and an active position, respectively. The diverting device 301 shows a great deal of resemblance with the diverting device 201, and consequently parts of the diverting device 301 that correspond to or at least are comparable to parts of the diverting device 201 will be indicated by the same numerals, augmented by 100 however. Insofar as certain numerals are lacking in the description of the diverting device 201, parts of the diverting device 301 that correspond to or at least are comparable to parts of the diverting device 1 will be indicated by the same numerals, augmented by 300, however.

The diverter belt 317 is driven by means of pulleys 361, 363, 365, 366 (not shown), 368, 367, 364 in a similar manner as in the diverting device 202. An electric motor 381 is provided at the bottom side of the frame 328 for driving the pulley 361 and thus the diverter belt 317. The electric motor 381 is combined with a transmission 382, which comprises a vertical outgoing shaft 383 at the upper side, on which a pulley 384 is mounted. A transmission belt 386 is passed over said pulley 384, which belt is also passed over a pulley 385 disposed under the frame 328, in line with the pulley 361, and which can be jointly rotated with the pulley 361 via a common shaft. When the electric motor 381 is actuated, this will lead to the diverter belt 317 being driven, therefore.

An actuating arm 330 is provided for pivoting the diverter arm 309. The actuating arm 330 is rotatable about a vertical axis of rotation 332 with respect to the frame 328 and which is rotatably connected (about vertical axis of rotation 331) to the frame 310 of the diverter arm 309 at an opposite end. A crank-connecting rod mechanism comprising a connecting rod 335 and a crank 336 is provided for pivoting the actuating arm 330 about the pivot axis 332 and thus pivoting the diverter arm 309 about the pivot axis 327. The pivot axis 327 coincides with the central axes of the pulleys 365 and 363, in the opposite direction. During which pivoting the frame 330 at the same time moves in its longitudinal direction with respect to the sliding element 341. The connection between the outgoing shaft 383 and the crank 336 is effected via the transmission 387. The transmission 387 is of the clutch-brake type, which is known to those skilled in the art. Thus the transmission 387 can be engaged and disengaged, as it were, by control means (not shown). In the engaged condition, pivoting of the diverter arm 309 will take place if the motor 381 is actuated. In the disengaged condition of the transmission 387, no pivoting of the diverter arm 309 will take place.

It is possible for the electric motor 381 to be actuated continuously during operation, in which case the diverter belt 317 is continuously driven, whilst the pivoting movement of the diverter arm 309 can be carried out temporarily by engaging and disengaging the transmission 387 when a product present on the conveyor 302 is to be discharged sideways. Alternatively, it is possible for the driving motor 381 to be actuated only when the control system delivers a signal to that effect when a product is to be diverted at the location of the diverting unit 308, in which connection the transmission 387 need not be of a type that can be engaged and disengaged. In the latter case, pivoting of the diverter arm 309 and driving of the diverter belt 317 would be inextricably connected. An important advantage of the diverting device 301 in comparison with the diverting devices 1, 101, 201 as discussed before is that a single common electric motor suffices for pivoting the diverter arm 309 as well as driving the diverter belt 317.

Figure 13A:
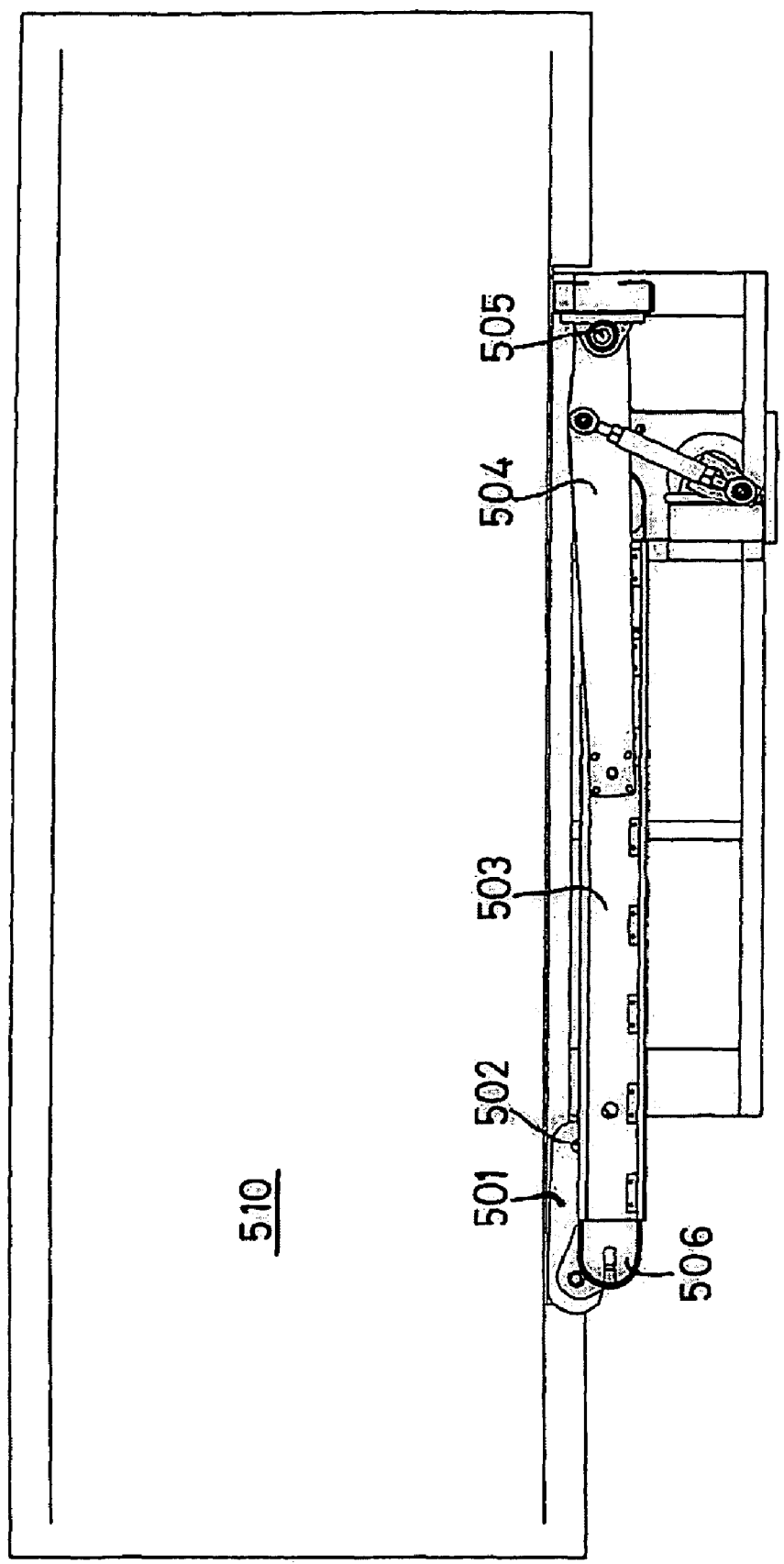
FIGS. 13a and 13b are corresponding views of a fifth embodiment of a device according to the invention that show corresponding passive and active positions thereof.
Figure 13B:
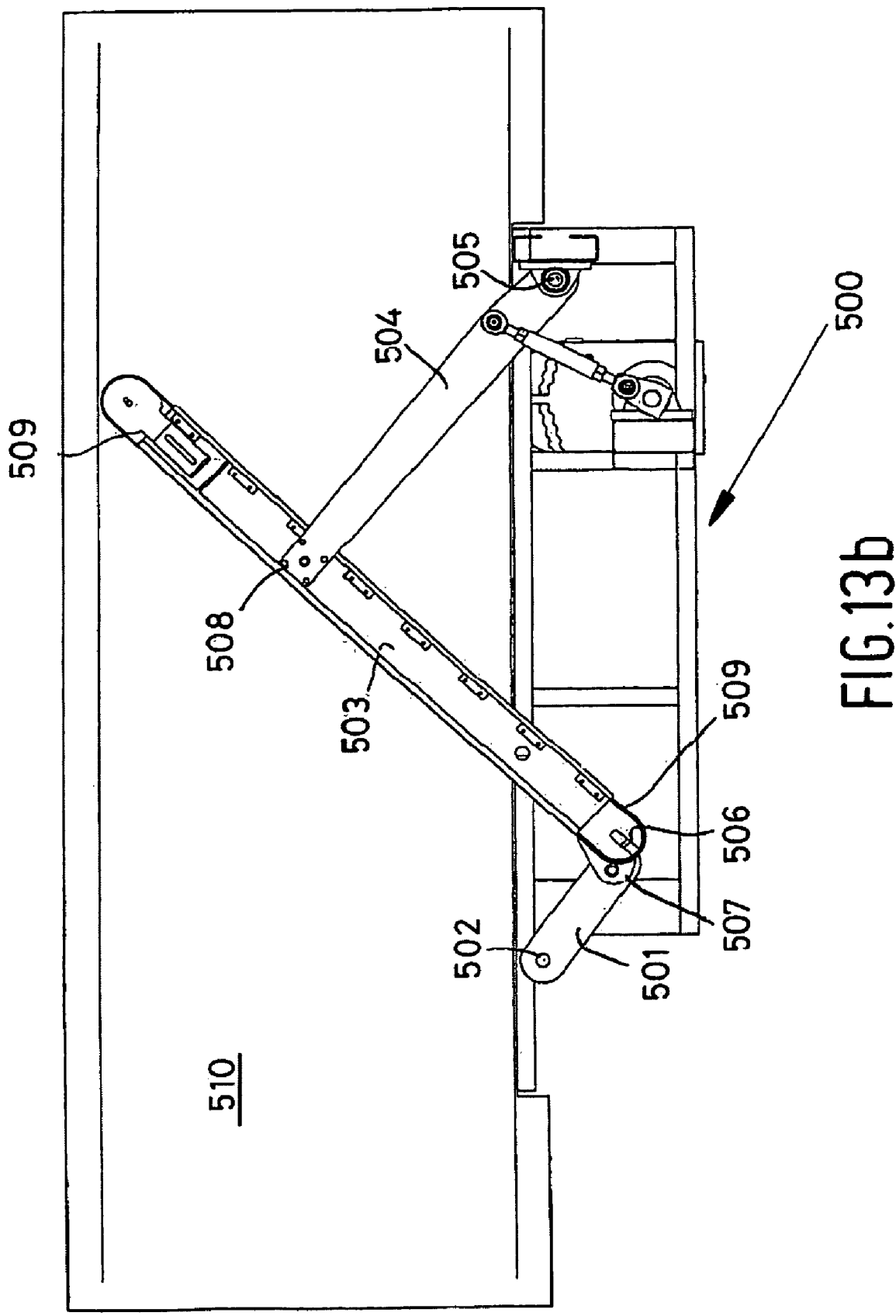

FIGS. 13*a* and 13*b* show a diverting device 500 according to a fifth non-limiting embodiment of a device according to the invention. FIG. 13*a* shows the device in a passive position. FIG. 13*b* shows the device in an active position. The diverting device 500 shows a great deal of resemblance with the diverting device 301, and the remainder of the description will focus on the differences between the devices.

As shown in FIG. 13*a*, the diverting arm 503 is connected to a pivot point 502 via a linking member 501. The linking member is connected to the diverter arm 503 at pivot point 507. A motorized roller 506 supplies rotary motion to a diverting belt 509 mounted on the diverter arm 503.

As shown in FIG. 13*b*, the driving arm 504 pivots around axis 505 to drive the diverter arm 503 into the path of the conveyor 510. The driving arm 504 and diverter arm 503 are connected at pivot point 508. While being pushed by driving arm 504, the diverter arm 503 pivots with respect to linking member 501 via pivot point 507. The linking member 501 simultaneously pivots about pivot point 502. Thus, the translation of the diverter arm 503 can be performed without need of a sliding device.

FIGS. 14*a* and 14*b* show a suitable type of bearing assembly 601 as can be used for guiding the pivoting and translating movement of a diverter arm forming part of a diverting device according to one non-limiting embodiment of the invention with respect to a frame of the diverting device in question. The bearing assembly 601 comprises a mounting plate 602 and rigidly fixed thereto a hub body 603, which is substantially cylindrical in shape and which has a U-shaped cross section, seen in side view, with legs 604, 605. A first roller body 606 is rotatably supported between the legs on a shaft 607 that extends perpendicularly to the central axis of the hub body 603 and perpendicularly to the longitudinal direction of the mounting plate 602, with the side of the roller body 606 remote from the mounting plate 603 projecting above the hub body 603. At the location of the legs 604, 605, the hub body 603 has a diameter that is reduced in comparison with the diameter of the part of the hub body 603 that is located directly adjacent to the mounting plate 602, around which reduced part a roller bearing 608 is fitted, whose outer race 610 is rotatable about the central axis 609, which extends perpendicularly to the central axis 607 and to the mounting plate 602.

The bearing assembly 601 is very suitable, for example, for use in a variant of the diverting device 1 according to FIGS. 1*a*-2*c*, which does not make use of the upper guide strip 25 combined with the upper sliding element 41 with guide shoes 26 and the lower guide strip (not shown) combined with the lower of sliding element with guide shoes. A bearing assembly 601 is provided at the upper side and at the bottom side of the diverter arm 9 instead of the sliding element, with the associated roller bodies 606 being directed towards the diverter arm 9 and the central axes 607 thereof being oriented perpendicularly to the diverter arm 9, whilst the mounting plates 602 are attached to the bottom side of the upper frame bracket 29 and to the upper side of the mirror-symmetric lower frame bracket (not shown), respectively. The diverter arm 9 is furthermore provided with U-shaped section members, which are provided at the same position and which have the same length as the guide strips 25, between the legs of which the roller bearing 608 extends.

The two roller bearing assemblies 601 thus make it possible in a constructionally simple manner for the diverter arm 9 to pivot about a vertical axis coinciding with the central axes 609 with respect to the frame 29, more specifically with respect to the frame brackets 29 thereof, and also to translate with respect to said frame brackets 29, with the diverter arm 9 extending between the roller bodies 606 of the respective roller bearing assemblies 601 and with the roller body 606 of the lower bearing assembly 601 also having a supporting function for the diverter arm 9.

According to a further variant it is possible to configure the actuating arm 30 (or another actuating arm 120, 230 or 330) as a double arm, by not only providing an actuating arm at the upper side of the diverter arm 9 but also, in mirror-symmetry therewith, at the bottom side thereof, in which case advantageous use may be made of a coupling rod, which couples the respective actuating arms 30 together at the corner points 34 thereof, which coupling rod is engaged in the center thereof by the connecting rod 35 so as to prevent the diverter arm from being subjected to a torsional load.

Figure 15:
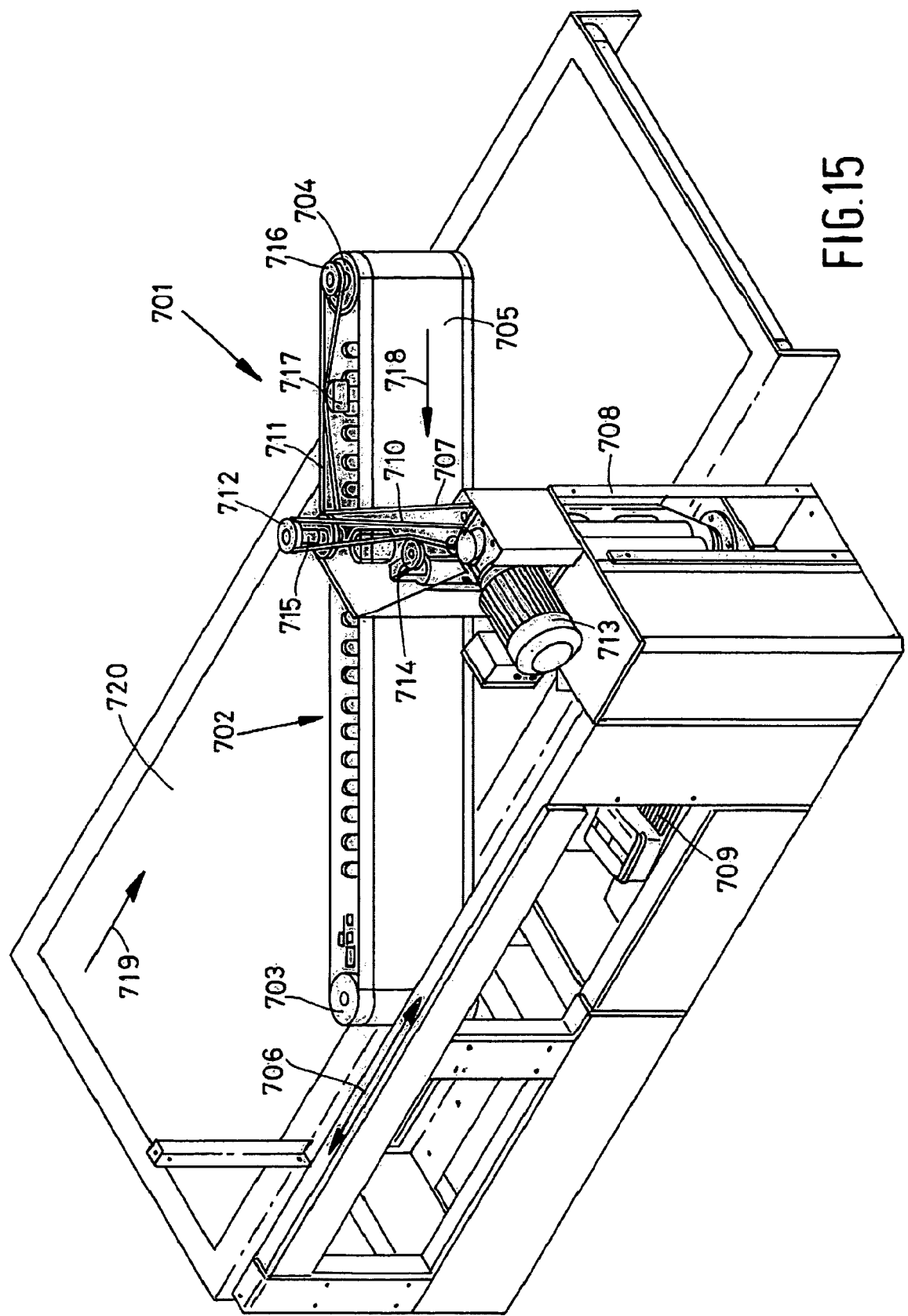
FIG. 15 is a perspective view of a sixth embodiment of the device in an active position thereof.

FIG. 15 shows a sixth preferred embodiment of the diverting device 701 in the active position thereof. The diverting device 701 has a diverter arm 702. The diverter arm 702 comprises a frame with a pulley 703 at the front side and a pulley 704 at the rear side. An endless diverter belt 705 is passed over said pulleys 703, 704. To move the diverter arm 702 between a passive position and an active position, a bearing assembly (not shown) is provided directly below the pulley 703 to pivot the diverter arm 702 about a vertical pivot axis coinciding with the central axis of the pulleys 703. Said bearing assembly is furthermore capable of reciprocating movement in a guide (not shown) in the directions indicated by the double arrow 706.

An actuating arm 707 is provided for moving the diverter arm 702 between the passive position and the active position, which actuating arm is pivotally connected (about a vertical pivot axis) at one end to the diverter arm 702 at a fixed (longitudinal) position of the diverter arm 702, and at the opposite end it is pivotally connected (about a vertical pivot axis) to the frame 708. An electric motor 709 is provided for pivoting the actuating arm 707 with respect to the frame 708; the manner of transmission between the electric motor 709 and the actuating arm 707 will be apparent to those skilled in the art from the description of the preceding preferred embodiments.

The diverting device 701 is different from previously discussed embodiments in particular as regards the manner in which the diverter belt 705 is driven. Flexible transmission means configured as a first transmission belt 710 and a second transmission belt 711 are to that end provided. At a position above the actuating arm 707, the first transmission belt 710 is passed over two pulleys that are coaxial with the two pivot axes for the actuating arm 707. The pulley 712 of said two pulleys is shown above the diverter arm 702 in FIG. 15. The pulley (not shown) for the first transmission belt 710 is driven by the electric motor 713. A tensioning roller 714 is provided for keeping the first transmission belt 710 at the correct tension, which tensioning roller presses against the first transmission belt 710 under a bias with respect to the actuating arm 707.

The second transmission belt 711 is likewise passed over two pulleys. The pulleys are mounted in bearings with respect to the diverter arm 702. The first of the two pulleys is not shown in FIG. 15, it is positioned under the actuating arm 707, coaxial with the pulley 712, and is rigidly connected thereto via the shaft 715. The other a pulley 716 is rigidly connected to the pulley 704, being coaxial therewith. The second transmission belt 711 is kept at the correct tension by way of a tensioning element 717, which is biased with respect to the frame of the diverter arm 702 in a similar manner as the tensioning roller 714.

The transmission between the electric motor 713 and the pulley 704 as described above makes it possible to drive the diverter belt 705 in the direction indicated by the arrow 717. In this way the situation is achieved that the front part of the diverter belt 705, i.e. the part located at the front side of the diverter arm 702 where objects to be diverted come into contact with the diverter belt 705, is advantageously loaded for tension as a result of the belt being driven via the pulley 704. Said driving takes place independently of the position of the arm 702 pivoting between the passive position and the active position.

To reduce the impact loads to which the diverter arm 702 is subjected as a result of the contact that occurs between objects to be sorted, which are being transported in the direction indicated by the arrow 719 on the conveyor 720, a springy support may be advantageously provided directly behind the diverter belt 705, which support springs inwards the moment an object to be diverted comes into contact with the diverter belt 705. It stands to reason that such a construction can be used not only in the diverting device 701 but also in the previously discussed embodiments of diverting devices.

The invention claimed is:

1. A device for selectively discharging products sideways from a load-bearing conveying surface of a conveyor that is configured to move in a direction of transport, comprising:
a frame supporting the conveyor;
an elongated diverter element including an upstream end, a downstream end, and a deflecting surface between the upstream end and the downstream end;
pivoting means for pivoting the diverter element in a reciprocal fashion about a vertical pivot axis, the vertical pivot axis being fixed with respect to the frame, the pivoting means for pivoting extending on one side of the conveying surface, between a passive position, in which the diverter element extends beside the conveying surface so as to allow products to pass freely on the conveying surface, and an active position, in which the diverter element extends at least partially above the conveying surface for discharging products present on the conveying surface sideways, relative to the direction of transport, from said conveying surface, the pivoting means including
guide means for slidably guiding the diverter element during the pivoting movement of the diverter element between the passive position and the active position, the guide means being pivotable about the vertical pivot axis; and
drive means for driving the deflecting surface with respect to a remaining part of the diverter element at least in the active position,
the pivoting means being arranged for translating the diverter element during the pivoting movement of the diverter element from the passive position to the active position and vice versa, and the pivoting means being further arranged for moving the upstream end towards the pivot axis and away from the pivot axis during the pivoting movement of the diverter element from the passive position to the active position and vice versa,
wherein the deflecting surface is made up of a vertically oriented diverter belt, which is passed over at least two pulleys that are rotatable about vertical axes of rotation, and
wherein at least one of the vertical axes is disposed on an upstream side of the diverting element.

2. A device according to claim 1, wherein the pivoting means comprise an actuating arm which engages the diverter element between the upstream end and the downstream end.

3. A device according to claim 2, wherein the actuating arm engages the diverter element between the pivot axis and the downstream end, on the one hand and the frame on the other hand.

4. A device according to claim 1, wherein the drive means comprises a transmission element that is rotatable about a vertical axis of rotation, which coincides with the pivot axis.

5. A device according to claim 1, wherein the drive means comprise a motor that is fixed to the frame.

6. A device according to claim 5, wherein said motor is a tubular motor.

7. A device according to claim 1, wherein the drive means comprises a motor that is fixed to the diverter element.

8. A device according to claim 1, wherein the pivoting means and the drive means comprise a common motor.

9. A device according to claim 8, wherein the pivoting means comprises a transmission that can be engaged and disengaged.

10. A device according to claim 1, wherein the deflecting surface extends perpendicularly to the direction of transport over at least 80% of a width of the conveying surface in the active position, the width being measured in a direction perpendicular to the direction of transport.

11. A device according to claim 10, wherein the deflecting surface extends perpendicularly to the direction of transport over the entire width of the conveying surface in the active position.

12. A device according to claim 1, further comprising a rigid linking member connected, via a pivot point, to the diverting mechanism closer to the upstream end of the diverter mechanism than to the downstream end.

13. The diverting device according to claim 1, wherein the diverting device is configured to discharge products present on the conveying surface sideways from said conveying surface across an edge of the conveying surface extending in the direction of transport of the conveying surface.

14. The diverting device according to claim 1, wherein the pivoting means are arranged for translating the diverter element in a direction parallel to the direction of transport during the pivoting movement of the diverter element.

15. A method of diverting objects from a conveying device comprising:
moving an object along a first path with the conveying device moving in a direction of transport;
pivoting a diverter member about a pivot axis fixed to a frame supporting the conveying device to at least partially obstruct the first path;
translating an end of the diverter member in a direction parallel to the direction of transport during at least a portion of the pivoting; and
moving the object along a second path using the diverting member so as to discharge the object from the conveying device across an edge of the conveying device extending in the direction of transport,
wherein translating comprises moving the diverter member linearly along a point about which the diverter member pivots and which is within the diverter member.

16. The method according to claim 15, wherein the translating includes pivoting a first portion of the diverting device about a first axis while restricting movement of a second portion of the diverting device to pivot about a second axis using a linking member connected between the second portion and the second axis.

17. The method according to claim 15, further comprising supplying rotary diverting motion to the diverting member along the pivot axis.

18. The method according to claim 17, wherein the supplying of rotary diverting motion is performed via a transmission connected between the diverting member and a motor.

19. A diverter device configured to selectively divert products from a load-bearing conveying surface comprising:
   a frame supporting a conveyor including the conveying surface, the conveying surface being configured to move objects in a direction of transport;
   a diverting member configured to discharge the objects, in a direction transverse to the direction of transport, from the conveying surface across an edge of the conveying surface extending in a direction parallel to the direction of transport, the diverting member including,
      a first axis of rotation,
      a second axis of rotation,
      a belt wrapped around the first and second axes of rotation,
      a third axis of rotation disposed between the first and second axes of rotation, fixed to the frame, and around which the diverting member is configured to pivot while translating;
   a motor connected to the frame;
   a first transmission member connected between the motor and the third axis of rotation;
   a second transmission member connected between the second and third axes of rotation; and
   a guide configured to guide translation of the first axis of rotation along a predetermined linear path parallel to the direction of transport of the objects.

20. The diverting device according to claim 19 further comprising a second tensioning element disposed between the second and third axis of rotation and configured to deflect the second transmission member.

21. The diverting device according to claim 19 further comprising a first tensioning element disposed between the motor and the third axis of rotation and configured to deflect the first transmission member.

* * * * *